United States Patent
Hutz

(10) Patent No.: US 12,211,366 B2
(45) Date of Patent: Jan. 28, 2025

(54) LOCATION BASED ALERTS

(71) Applicant: Alarm.com Incorporated, Tysons, VA (US)

(72) Inventor: David James Hutz, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/880,188

(22) Filed: Aug. 3, 2022

(65) Prior Publication Data

US 2022/0375330 A1 Nov. 24, 2022

Related U.S. Application Data

(63) Continuation of application No. 16/918,725, filed on Jul. 1, 2020, now Pat. No. 11,417,199, which is a
(Continued)

(51) Int. Cl.
*G08B 25/01* (2006.01)
*G06Q 10/20* (2023.01)
*G07C 9/00* (2020.01)
*G07C 9/27* (2020.01)
*G07C 9/28* (2020.01)
(Continued)

(52) U.S. Cl.
CPC ........... *G08B 25/016* (2013.01); *G06Q 10/20* (2013.01); *G07C 9/27* (2020.01); *G08B 21/18* (2013.01); *G08B 25/005* (2013.01); *G08B 25/006* (2013.01); *G08B 25/10* (2013.01); *G08B 29/02* (2013.01); *G07C 9/00* (2013.01);
(Continued)

(58) Field of Classification Search
CPC .... G08B 25/016; G08B 21/18; G08B 25/005; G08B 25/006; G08B 25/10; G08B 29/02; G08B 21/0269; G08B 21/24; G06Q 10/20; G07C 9/27; G07C 9/00; G07C 9/28
See application file for complete search history.

(56) References Cited

U.S. PATENT DOCUMENTS 6,661,340 B1 * 12/2003 Saylor .................. G08B 25/016
340/7.52
6,943,671 B2 9/2005 McGee et al.
(Continued)

FOREIGN PATENT DOCUMENTS

CA 2762101 A1 * 11/2010 ......... G08B 13/2402

*Primary Examiner* — Mohamed Barakat
*Assistant Examiner* — Rufus C Point
(74) *Attorney, Agent, or Firm* — Fish & Richardson P.C.

(57) ABSTRACT

Monitoring system alert technology, in which monitoring system data is accessed from a monitoring system that is located in a property of a user and the monitoring system data is analyzed against one or more rules that define alerts provided for the monitoring system. Based on the analysis, a determination is made that an alert for the monitoring system is needed and conditions for providing the alert are accessed. Location of a mobile device of a user associated with the monitoring system and timing related to providing the alert are monitored. The monitored location of the mobile device and the monitored timing are analyzed with respect to the accessed conditions. Based on the analysis, a determination is made that the accessed conditions for providing the alert are met and the alert is output at the mobile device.

18 Claims, 14 Drawing Sheets

Related U.S. Application Data continuation of application No. 16/036,131, filed on Jul. 16, 2018, now Pat. No. 10,706,714, which is a continuation of application No. 15/405,768, filed on Jan. 13, 2017, now Pat. No. 10,026,300, which is a continuation of application No. 14/944,472, filed on Nov. 18, 2015, now Pat. No. 9,547,973, which is a continuation of application No. 14/215,565, filed on Mar. 17, 2014, now Pat. No. 9,196,148.

(60) Provisional application No. 61/790,652, filed on Mar. 15, 2013.

(51) Int. Cl.
*G08B 21/02* (2006.01)
*G08B 21/18* (2006.01)
*G08B 21/24* (2006.01)
*G08B 25/00* (2006.01)
*G08B 25/10* (2006.01)
*G08B 29/02* (2006.01)

(52) U.S. Cl.
CPC ............ *G07C 9/28* (2020.01); *G08B 21/0269* (2013.01); *G08B 21/24* (2013.01)

(56) References Cited

U.S. PATENT DOCUMENTS

| | | |
|---|---|---|
| 7,084,758 B1 | 8/2006 | Cole |
| 7,113,090 B1 | 9/2006 | Saylor et al. |
| 7,518,514 B2 | 4/2009 | Bauchot et al. |
| 7,552,101 B2 | 6/2009 | Bleines |
| 7,821,386 B1 | 10/2010 | Barrett et al. |
| 8,665,084 B2 | 3/2014 | Shapiro et al. |
| 8,705,704 B2 | 4/2014 | Smith et al. |
| 8,705,716 B2 | 4/2014 | Gregory |
| 8,798,260 B2 | 8/2014 | Smith et al. |
| 8,825,020 B2 | 9/2014 | Mozer et al. |
| 8,855,830 B2 | 10/2014 | Imes et al. |
| 8,988,215 B1 | 3/2015 | Trundle et al. |
| 9,054,893 B2 | 6/2015 | Elliot et al. |
| 9,094,410 B2 | 7/2015 | Elliot et al. |
| 9,098,279 B2 | 8/2015 | Mucignat et al. |
| 9,119,038 B2 | 8/2015 | Woods et al. |
| 9,131,040 B2 | 9/2015 | Elliot et al. |
| 9,196,148 B1 | 11/2015 | Hutz |
| 9,439,034 B2 | 9/2016 | Lott et al. |
| 9,514,630 B1 | 12/2016 | Steven |
| 9,547,973 B1 | 1/2017 | Hutz |
| 9,635,540 B2 | 4/2017 | Mullen |
| 10,026,300 B1 | 7/2018 | Hutz |
| 10,706,714 B1 | 7/2020 | Hutz |
| 11,417,199 B1 | 8/2022 | Hutz |
| 2003/0128113 A1 | 7/2003 | Chang et al. |
| 2004/0093274 A1* | 5/2004 | Vanska ............ G06Q 30/0631 705/26.7 |
| 2009/0009326 A1 | 1/2009 | Veiga, III |
| 2009/0066488 A1 | 3/2009 | Qiahe et al. |
| 2009/0259572 A1 | 10/2009 | Lay et al. |
| 2010/0217642 A1 | 8/2010 | Crubtree et al. |
| 2010/0218108 A1 | 8/2010 | Crabtree et al. |
| 2010/0295676 A1* | 11/2010 | Khachaturov ......... G08B 21/24 340/309.7 |
| 2011/0169633 A1 | 7/2011 | Lauder et al. |
| 2012/0173414 A1 | 7/2012 | Hoag |
| 2013/0217366 A1* | 8/2013 | Kolodziej ............. H04W 4/029 455/414.1 |
| 2013/0268353 A1 | 10/2013 | Zeto, III et al. |
| 2014/0091001 A1* | 4/2014 | Chan .................... B42D 15/00 283/67 |
| 2014/0156296 A1* | 6/2014 | Stenzler ................. G16H 20/10 705/2 |
| 2014/0248910 A1 | 9/2014 | Dave et al. |
| 2014/0253321 A1* | 9/2014 | Srinivasan ........... G08B 27/00 340/539.11 |
| 2014/0365304 A1 | 12/2014 | Showers et al. |

\* cited by examiner

400

| | Alert Type | Sensor Condition | Geographic Condition | Timing Condition |
|---|---|---|---|---|
| 450 | Filter Replace | Air Flow Below Threshold | Within One Mile of Hardware Store | Hardware Store Open |
| 460 | Smoke Alarm Battery | Battery Level Below Threshold | At Home | 7 AM – 10 PM |
| 470 | Inefficient Thermostat | Occupancy Does Not Match Schedule | Away From Home | 9 AM – 8 PM |
| 480 | Electronic Lock Malfunction | Loss of Communication | Within One Mile of Hardware Store | Increase By One Mile Each Day |

Column headers: 410, 420, 430, 440

FIG. 4

LOCATION BASED ALERTS

CROSS REFERENCE TO RELATED APPLICATIONS

This application is a continuation of U.S. application Ser. No. 16/918,725, filed Jul. 1, 2020, which is a continuation of U.S. application Ser. No. 16/036,131, filed Jul. 16, 2018, which is a continuation of U.S. application Ser. No. 15/405,768, filed Jan. 13, 2017, which is a continuation of U.S. application Ser. No. 14/944,472, filed Nov. 18, 2015, which is a continuation of U.S. application Ser. No. 14/215,565, filed Mar. 17, 2014, which claims the benefit of U.S. Provisional Application No. 61/790,652, filed Mar. 15, 2013. All of these prior applications are incorporated by reference in their entirety.

TECHNICAL FIELD

This disclosure relates to location based and time sensitive monitoring system alerts.

BACKGROUND

Home monitoring and home automation systems capable of providing alerts to users can do so upon the detection of a particular event. In some cases, users may receive alerts using a mobile device when they are in locations or at times when it is not convenient to address the event to which the alert relates.

SUMMARY

Techniques are described for location based and time sensitive monitoring system alerts.

Implementations of the described techniques may include hardware, a method or process implemented at least partially in hardware, or a computer-readable storage medium encoded with executable instructions that, when executed by a processor, perform operations.

The details of one or more implementations are set forth in the accompanying description below. Other features will be apparent from the description and the drawing.

DESCRIPTION OF THE DRAWINGS

FIG. 4 illustrates example conditions for providing alerts.

DETAILED DESCRIPTION

Figure 1A:
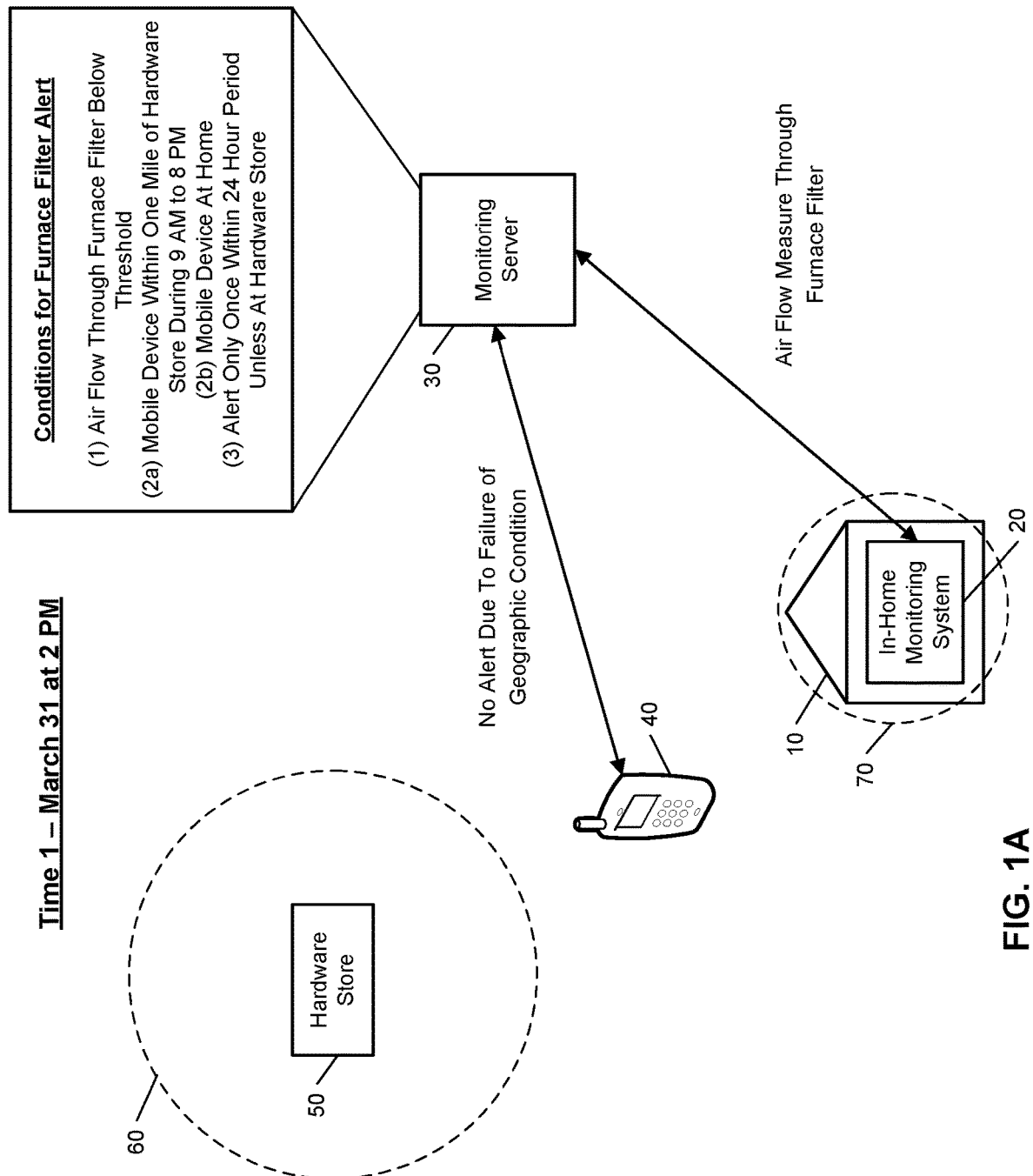
FIGS. 1A-1C illustrate an example of providing location based and time sensitive monitoring system alerts.

Techniques are described for providing a user with alerts based on the location of the user and/or a time. A system, for example a home monitoring or home automation system, may be capable of detecting the occurrence of events and sending one or more alerts relating to the detection of the events. A user device, such as a mobile user device, may receive one or more alerts sent by the system, and may store the one or more alerts in order to display the alerts based on a certain triggering event. In response to receiving the one or more alerts, the user device might also determine one or more qualifications for presenting the alerts to a user. For example, a mobile user device may receive one or more alerts and may determine that the one or more alerts should be presented based on determining that the device is in a particular location, that it is a certain time of day, and/or that a certain amount of time has passed since the one or more alerts were sent. In response to detecting the triggering event, the user device may then output the one or more alerts to a user. In some implementations, a triggering event for the output of one or more alerts may be determined based what circumstance may best allow a user to address the subject of the alert. For example, a home monitoring system capable of monitoring the status of a furnace filter may determine that the filter must be replaced, and may send an alert to a user device indicating that a user should replace the filter. Upon receiving the alert, the user device may store the alert and may determine that the alert does not need to be presented to the user immediately, but rather should be displayed to a user when they are at home. Upon determining that the location of the user device becomes the location of the home, the user device may then present the alert to the user. By using a particular trigger event to provide a user with an alert, it may increase the likelihood that the user addresses the subject of the alert, for example, by replacing the furnace filter.

In some implementations, a user may provide one or more responses to an alert presented on a user device. In some instances, a user may respond to an alert presented on a user device by indicating that the detected event has been attended to, for example, that the user has replaced the furnace filter and that the alarm associated with replacing the furnace filter should be dismissed or reset. Additionally or alternatively, a user may respond to an alert presented on a user device by indicating that the alert should be presented again as a reminder at another time, for example, by selecting a "Snooze" option. In such an instance, the alert may be presented to the user based on determining that certain criteria are met, such as the next time that the user device is detected as entering the home, after a certain amount of time, and/or at a particular time. For example, if a user receives an alert on a user device suggesting that a furnace filter should be replaced, and in response to receiving the alert selects a "Snooze" option, the user device may present a reminder alert that the user should replace the furnace filter, for example, the next time that the user device enters the home, or the following day at the same time. According to some implementations, an alert reminder may be the same or may be different from an initial alert output by a user device. For example, an initial alert output by a user device related to replacing a furnace filter may read, "Your furnace filter needs to be replaced," while a reminder alert may read, "This is a reminder that your furnace filter needs to be replaced." According to some implementations, the system, such as a home monitoring or home automation system, may send more than one version of an alert to a user device, for example, an alert relating to an initial alert, and one or more other alerts relating to subsequent alerts after the initial alert. Additionally or alternatively, a user device, based on receiving one or more alerts or versions of alerts, may store the one or more alerts or versions of the alerts, and/or may generate and store one or more alerts or versions of alerts based on those received. Then, based on determining that criteria for outputting the alerts or reminder alerts are met, may output the alerts or reminder alerts.

According to some implementations, a user may respond to an alert presented on a user device by indicating that they are not currently able to address the alert. For example, at the time of receiving an alert a user may lack the necessary tools, replacement parts, and/or knowledge to be able to address the alert. As an example, a user may receive an alert indicating that a furnace filter should be replaced, and the user may further know that they currently do not own a replacement furnace filter and thus needs to purchase a replacement. Since the user is aware that they are not currently able to address the alert and that they need to go to a store to purchase a replacement furnace filter, the user may indicate that they are not able to address the alert, and may further indicate that they need to purchase a replacement furnace filter.

According to some implementations of the described subject matter, a system may, based on a user indicating that they are currently unable to address an alert, generate and/or output one or more additional alerts to a user device in order to attempt to aid the user in addressing the alert. In some instances, the additional alerts may be alerts indicating that the location of a user device is near a location that can help the user address the alert. For example, if a user indicates that they are currently not able to replace a furnace filter and further indicates that they are not able to replace the filter because they need to purchase a replacement furnace filter, the system of some implementations may output to the user device an alert based on determining, for example, that the user device is located near a store that sells furnace filters.

In some implementations, the system may output alerts to a user device based on the proximity of the user device to a particular location that may be useful for the user in addressing an alert. For example, if a user indicates that they must purchase a replacement furnace filter before they can address an alert related to replacing a furnace filter, a user device may generate and/or output an alert indicating that a user should replace a furnace filter and that a store that sells furnace filters is nearby based on determining, for example, that the user device is within a certain distance of the store. For example, the user device may output an alert indicating that a user should replace a furnace filter and that a store that sells furnace filters is nearby based on the user device being, e.g., within, one block, one mile, etc., from the store.

The system may continue to generate and/or output the same alert or a related alert each time that the user device is within certain proximity of a relevant location, such as a store, or may generate and/or output the same alert or a related alert based on additional criteria. For instance, the system may only output an alert to a user device indicating that the device is close to a relevant location once for a determined period of time. As an example, the system may only indicate that the user device is in proximity of a relevant location, such as a store, once per day.

As another example, the system may only indicate that the user device is in proximity to a relevant location based on the location being in proximity to a specific relevant location or subset of relevant locations, e.g., a first of a set of detected relevant locations, a subset of relevant locations, a preferred relevant location, or a convenient relevant location, for example, a relevant location that is closest to a home or that is most likely to have a particular replacement part in stock. For example, a user that has indicated that they need to purchase a replacement furnace filter may receive an alert indicating that they are near a store that sells furnace filters when they are near a first store that sells furnace filters, but might not receive additional alerts if they continue to pass other stores that sell furnace filters. Additionally or alternatively, the same user may receive an alert each time they are in proximity to certain stores that sell furnace filters, but not in proximity to other stores that sell furnace filters. Additionally or alternatively, the same user may receive an alert when they are in proximity of a store that sells furnace filters and that has been identified as a preferred store, for example, based on the user identifying that the particular store is a favorite store or based on determining that the user has visited that store previously. Additionally or alternatively, the same user may receive an alert when they are in proximity of a store that sells furnace filters and that has been identified as a convenient store, for example, a store that is close to the user's home or that is more likely to have furnace filters in stock, and may not provide alerts based on determining that the user is in proximity to other stores that are not identified as convenient stores.

According to some implementations of the subject matter described herein, the proximity of a user device to a relevant location for addressing an alarm may change based on the amount of time that has passed since an initial alert. For instance, the distance associated with a user device being identified as within proximity to a relevant location may change, for example, a radial distance from a particular relevant location that a user device is required to be within to be identified as in proximity may become further or shorter. In some instances, a distance required for a user device to be identified as within proximity of a particular location may become a larger distance as the amount of time from the initial alert increases. For example, a user who receives an alert that they should change a furnace filter and responds that they are currently unable to replace the filter because they need to purchase a replacement furnace filter, may initially receive alerts that they are near a store that sells furnace filters based on being within a certain distance, e.g., one block, from a store that sells furnace filters. If, according to the example, the user does not indicate that they have purchased and/or replaced the furnace filter with a period of time, e.g., a few days, then the distance required for the user device to be in proximity of the store may expand, for example, from within one block to within one mile of the store. According to some implementations of the described subject matter, the distance associated with the proximity of the user device to the relevant location may continue to change, based on another amount of time passing since the initial alert. For example, if the user still does not indicate that they have purchased and/or replaced the furnace filter after, e.g., one week, than the distance required for the user device to be in proximity of the store may expand further, for example, from within one mile of the store to within three miles of the store. The distance requirements associated with a user device being within proximity of a relevant location might or might not continue to change for a set period of time or indefinitely after the initial alert. By changing the distance associated with the output of a message indicating that a user device is within proximity of a particular relevant location, a user may be encouraged to address outstanding or overdue alerts.

According to some implementations of the described subject matter, a distance required for a user device to be identified as within proximity of a particular location may become a shorter distance as the amount of time from the initial alert increases. Motivation for such an approach may be for example, allowing a user who repeatedly does not address a particular alert from being continuously notified of the alert, while still being capable of alerting the user based on them being in a close proximity to a relevant location. For example, a user who is alerted multiple times of being in proximity of a store that sells furnace filters may repeatedly indicate that they have not addressed the alert. In response, the distance associated with the proximity of the user device to the store that is required to trigger an alert may decrease. The result, for example, may involve that the user will not be bothered by continuous alerts to replace a furnace filter, but may still receive an alert if the user's location is very near or convenient for purchasing a replacement furnace filter, for example, that the user is already in the same store to purchase something else.

According to some implementations, any methods or combinations of methods may determine the distance associated with a user device being identified as within proximity of a relevant location. For example, the distance associated with the proximity may increase for a certain period of time before decreasing after a certain time threshold. Additionally or alternatively, any other method or combination of methods may be used to determine a proximity distance, e.g., an importance level associated with a particular alert, a type, convenience, preference, or other characteristic associated with the relevant location, an amount of time estimated for the user to travel from their current location to the relevant location, etc.

In some examples, a time to reach a location (e.g., a store or property) may be used in evaluating geographic conditions. In these examples, instead of evaluating distance/proximity to a location, the system may determine a time to reach the location and provide alerts when the time to reach the location is within a threshold value. In evaluating the time to reach the location, the system may consider the current mode of transportation of a user. The current mode of transportation may be determined based on user input or may be inferred based on a rate at which the geographic location is changing and/or a route being travelled. The system may use different distance thresholds based on mode of transportation (e.g., a longer threshold for driving versus a shorter threshold for walking). In addition, the system may only provide alerts if the user is walking, not driving. In this regard, the system would only provide the alert if a user is walking in the mall, not driving by on the highway.

In some implementations, the system may evaluate geographic conditions at all times, regardless of whether alerts have been detected based on sensor data. In these implementations, the system may determine that geographic location conditions are satisfied and then check whether sensor data for any alerts associated with the geographic location conditions indicate a need to alert. For example, the system may determine that a user is located at a hardware store and then, based on that determination, check whether any alerts indicate a need for materials available for purchase at the hardware store. In this example, a mobile device may detect that it is located at the hardware store and then send a message to a server to ask whether any alerts should be provided based on the location at the hardware store. The server then may respond with any alerts that are convenient for the user to address when the user is located at the hardware store.

Figure 1B:
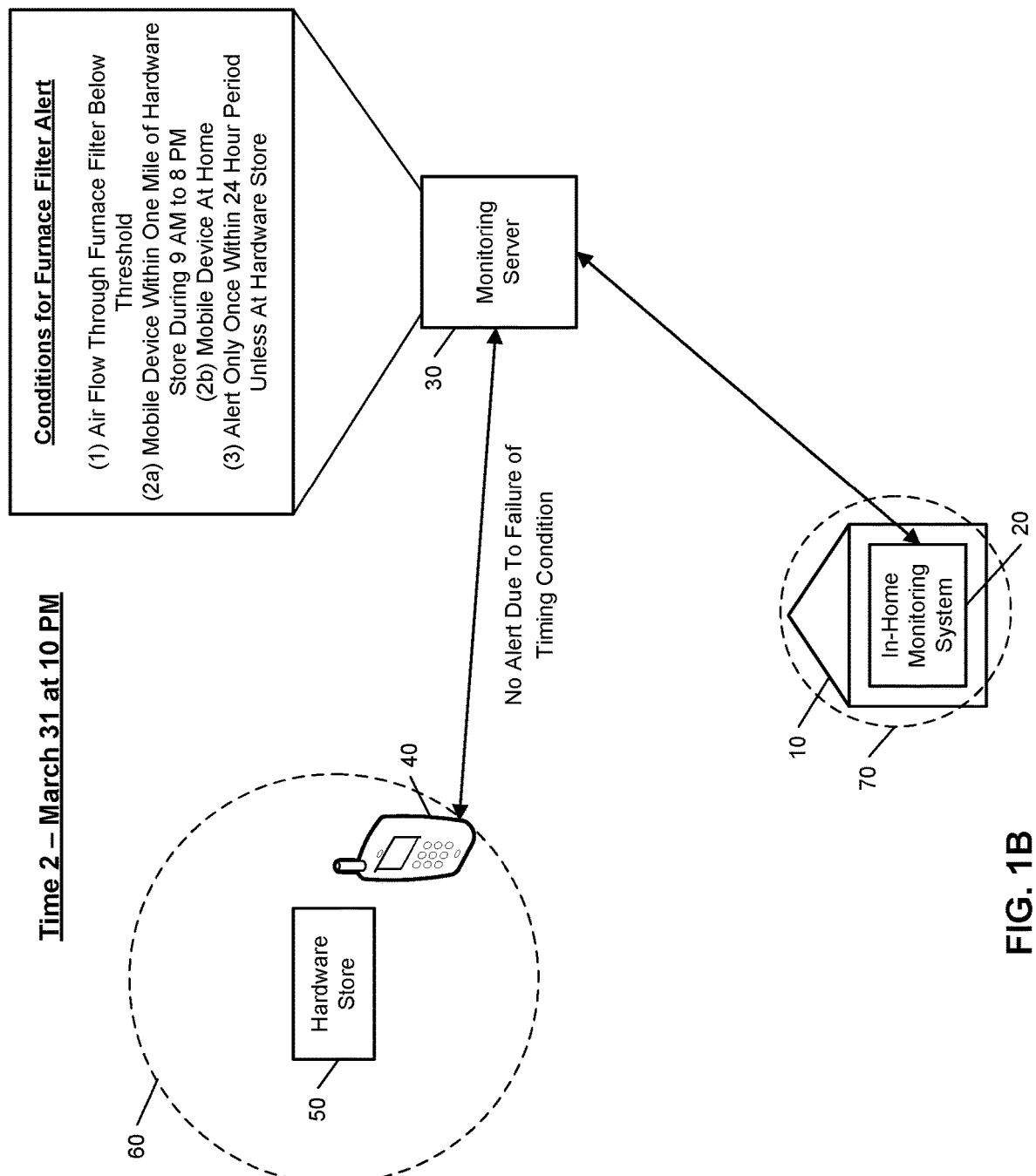
Figure 1C:
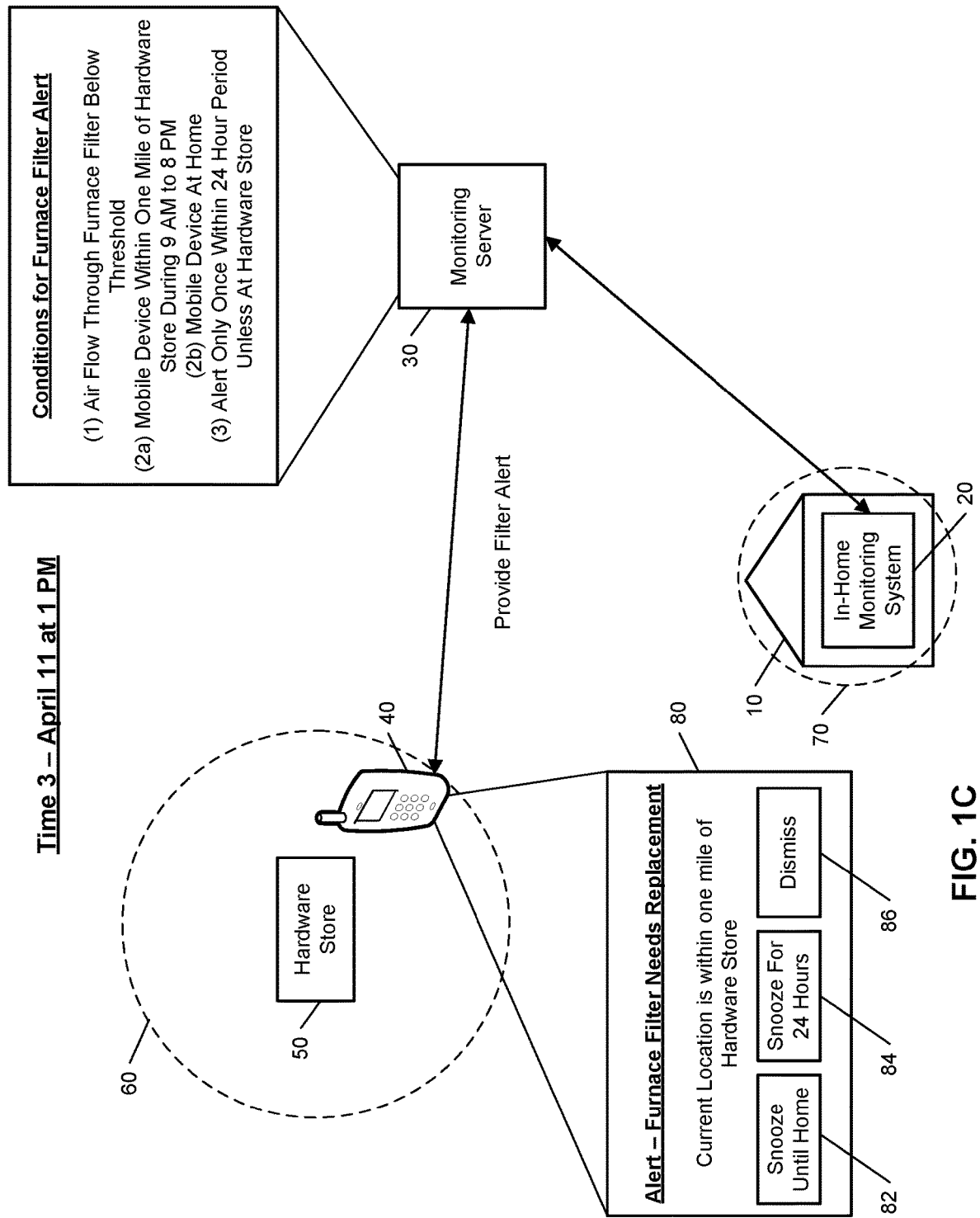

FIGS. 1A-1C illustrate an example of providing location based and time sensitive monitoring system alerts. As shown in FIG. 1A, a property 10 (e.g., a home) of a user is monitored by an in-home monitoring system 20 (e.g., in-home security system) that includes components that are fixed within the property 10. The monitoring system 20 includes a control panel that communicates over a short-range wired or wireless connection with sensors to receive sensor data descriptive of attributes of the property 10 including activity at the property 10. The control panel also communicates over a long-range wired or wireless connection with a monitoring server 30. The monitoring server 30 is located remote from the property 10 and manages the in-home monitoring system at the property 10, as well as other (and, perhaps, many more) in-home monitoring systems located at different properties that are owned by different users. The monitoring server 30 receives, from the control panel of the monitoring system 20, sensor data descriptive of attributes of the property 10 detected by the sensors included in the monitoring system 20.

In the example shown in FIG. 1A, the monitoring server 30 analyzes sensor data received from the monitoring system 20 against conditions for providing alerts for the monitoring system 20. The conditions may include one or more rules that specify when an alert for the monitoring system 20 is needed. The conditions also may specify when and where to send the alert based on the sensor data indicating that an alert is needed. The conditions may be defined as default settings at the monitoring server 30 and may be adjusted by the user of the monitoring system 20.

In the example shown in FIG. 1A, only one set of conditions is shown for a furnace filter alert. The set of conditions shown for the furnace filter alert include four conditions in which the first condition is labeled as condition (1), the second condition is labeled as condition (2a), the third condition is labeled as condition (2b), and the fourth condition is labeled as condition (3). The labels were chosen to illustrate that the furnace filter alert is sent based on the first condition and the fourth condition being met and either the second condition or the third condition being met (e.g., (1) and ((2a) or 2(b)) and (3)). In addition, although only one set of conditions is shown for brevity, the monitoring server 30 may store more (perhaps many more) sets of conditions for the various types of alerts provided by the monitoring server 30 for the monitoring system 20. Each type of alert may have a corresponding set of conditions that govern alerting for that type of alert. The types of alerts sent by the monitoring server 30 and the conditions for sending those alerts may be adjusted based on user input provided by the user of the monitoring system 20 to the monitoring server 30.

In FIG. 1A, the monitoring server 30 receives, from the monitoring system 20, sensor data that corresponds to an air flow measure of air flowing through a furnace filter. In this example, the monitoring system 20 includes one or more sensors that measure air flow through the furnace filter located at the property 10. The monitoring system 20 may send the air flow measure data periodically, in response to a change in the value, upon request from the monitoring server 30, or in response the air flow measure dropping below a threshold level. The monitoring server 30 receives the air flow measure and, based on receipt of the air flow measure, accesses the furnace filter alert conditions and evaluates whether a furnace filter alert is needed for the monitoring system 20. As shown, the first condition for a furnace filter alert is that the air flow through the furnace filter is below a threshold value. Accordingly, the monitoring server 30 first compares the received air flow measure to the threshold value and determines whether the received air flow measure is below the threshold value. Based on a determination that the received air flow measure is above the threshold value, the monitoring server 30 determines that a furnace filter is not presently needed, stops processing of the received air flow measure, and continues to monitor for additional sensor data from the monitoring system 20.

However, based on a determination that the received air flow measure is below the threshold value, the monitoring server 30 determines that a furnace filter alert is needed and moves on to assess the other conditions related to when and where to send the furnace filter alert. The other conditions related to when and where to send the furnace filter alert are designed to provide the alert to the user at a time and place that is convenient for the user to address the alert. In this regard, the other conditions define geographic and timing conditions for providing the alert to the user.

In the example shown in FIG. 1A, a mobile device 40 (e.g., smartphone) of the user is the target of alerts for the monitoring system 20. Although the mobile device 40 is described as the only target for alerts in FIG. 1A, multiple targets for alerts may be used and different types of devices may be used as targets. The monitoring server 30 is able to send alerts to the mobile device 40 over a network. The alerts may be provided in the form of an electronic message (e.g., an electronic mail message or an SMS message) or may be provided as alert communications through a mobile application operating on the mobile device 40. The monitoring server 30 communicates with the mobile device 40 and tracks a location of the mobile device 40 for use in evaluating the geographic conditions for sending the furnace filter alert.

As shown, the second condition for providing the furnace filter alert has both a geographic component and a timing component. Specifically, the second condition defines that the furnace filter alert should be delivered when the mobile device 40 is within one mile of a hardware store 50 during the hours nine in the morning and eight in the evening. The second condition is directed to providing the furnace filter alert at a location that is convenient for addressing the alert (e.g., near the hardware store 50 that sells furnace filters) and at a time convenient for addressing the alert (e.g., during the hours of operation of the hardware store 50). To assess the second condition, the monitoring server 30 defines a hardware store region 60 that represents a region that is within a one mile radius of the hardware store 50.

The third condition for providing the furnace filter alert has only a geographic component. Specifically, the third condition specifies that the furnace filter alert should be provided when the mobile device 40 is located at the property 10. The third condition is directed to providing the furnace filter alert at a location that is convenient for addressing the alert (e.g., at the property 10 where the furnace filter can be changed). No timing component is associated with the third condition. To assess the third condition, the monitoring server 30 defines a property region 70 that represents a region that is used to assess whether the mobile device 40 is located at the property 10.

The fourth condition for providing the furnace filter alert has a timing component and a geographic component. Specifically, the fourth condition specifies that the furnace filter alert should only be provided once in a twenty-four hour period, unless the mobile device 40 is located at the hardware store 50 (not just within one mile). The fourth condition is designed to avoid an inconvenient series of alerts that may annoy the user when the user plans to address the alert, but has not had the time to get the materials (e.g., furnace filter) needed to address the alert.

Because, in FIG. 1A, the monitoring server 30 determined that the first condition was satisfied and that a furnace filer alert is needed for the monitoring system 20, the monitoring server 30 progresses to evaluate the second to fourth conditions. In doing so, the monitoring server 30 determines a location of the mobile device 40 and compares the location of the mobile device 40 to the hardware store region 60 and the property region 70. Based on the comparisons, the monitoring server 30 determines that the first condition is not satisfied because the mobile device 40 is not located within the hardware store region 60, even though the timing component of the first condition is satisfied, and also determines that the second condition is not satisfied because the mobile device 40 is not located within the property region 70. In this example, the fourth condition is irrelevant because the furnace filter alert has yet to be provided. Accordingly, based on the evaluation of the second to fourth conditions, the monitoring server 30 determines to withhold the furnace filter alert at this time because, even though the alert is needed, the conditions for where and when to provide the alert are not met. In this regard, the monitoring server 30 queues the furnace filter alert as an alert that needs to be provided and continues to monitor the geographic location of the mobile device 40 and timing to detect a point in time where the conditions for where and when to provide the alert are met. The monitoring server 30 may periodically assess the second to fourth conditions to determine whether the mobile device 40 arrives at a location and time convenient for the alert.

FIG. 1B illustrates the example shown in FIG. 1A at a second time. As shown, FIG. 1B shows the same day as FIG. 1B, but at ten in the evening, rather than two in the afternoon. In FIG. 1B, the monitoring server 30 has already determined that a furnace filter alert is needed and is monitoring the second to fourth conditions to provide the alert at a convenient place and time. In doing so, the monitoring server 30 determines a location of the mobile device 40 and compares the location of the mobile device 40 to the hardware store region 60 and the property region 70. Based on the comparisons, the monitoring server 30 determines that the location component of the first condition is satisfied because the mobile device 40 is located within the hardware store region 60 and also determines that the second condition is not satisfied because the mobile device 40 is not located within the property region 70. In this example, the monitoring server 30 evaluates the timing component of the second condition and determines that the timing component fails because the current time is outside of the window defined by the second condition (i.e., the hardware store is closed). As such, like in FIG. 1A, the monitoring server 30 determines that the second and third conditions are not met. Again, the fourth condition is irrelevant because the furnace filter alert has yet to be provided. Accordingly, based on the evaluation of the second to fourth conditions, the monitoring server 30 determines to withhold the furnace filter alert at this time because, even though the alert is needed, the conditions for where and when to provide the alert are not met. In this regard, the monitoring server 30 continues to queue the furnace filter alert as an alert that needs to be provided and continues to monitor the geographic location of the mobile device 40 and timing to detect a point in time where the conditions for where and when to provide the alert are met.

FIG. 1C illustrates the example shown in FIGS. 1A and 1B at a third time. As shown, FIG. 1C shows a different day than FIGS. 1A and 1B; namely, April 11 at one in the afternoon. In FIG. 1C, the monitoring server 30 has already determined that a furnace filter alert is needed and is monitoring the second to fourth conditions to provide the alert at a convenient place and time. In doing so, the monitoring server 30 determines a location of the mobile device 40 and compares the location of the mobile device 40 to the hardware store region 60 and the property region 70. Based on the comparisons, the monitoring server 30 determines that the location component of the first condition is satisfied because the mobile device 40 is located within the hardware store region 60 and also determines that the second condition is not satisfied because the mobile device 40 is not located within the property region 70. In this example, the monitoring server 30 evaluates the timing component of the second condition and determines that the timing component is satisfied because the current time is within the window defined by the second condition (i.e., the hardware store is open). As such, the monitoring server 30 determines that the second condition is met and the alert should be sent, unless the fourth condition indicates that it should not be sent. In this example, the fourth condition is irrelevant because the furnace filter alert has yet to be provided. Accordingly, based on the evaluation of the second to fourth conditions, the monitoring server 30 determines to provide the furnace filter alert at this time because the alert is needed and the conditions for where and when to provide the alert are met. Even though the need for the alert was detected a significant period of time earlier (e.g., more than twenty-four hours prior), the monitoring server 30 withheld the alert and waited to provide the alert at a time and place that is convenient for the user to address the alert.

As shown, in response to receiving the alert from the monitoring server 30, the mobile device 40 displays an interface 80 for the alert. The interface 80 includes a description of the alert (e.g., Alert—Furnace Filter Needs Replacement) and a description of why the alert is presently convenient for the user to address (e.g., Current Location is within one mile of Hardware Store). The interface 80 also includes controls (e.g., buttons) that enable the user to take action with respect to the alert. The controls include a first snooze control 82, a second snooze control 84, and a dismiss control 86. The first snooze control 82 is a geographic snooze control that causes the alert to be snoozed until the mobile device 40 is located at a particular location. As shown, the first snooze control 82 causes the alert to be snoozed until the mobile device 40 is located at the property 10. The user may select the first snooze control 82 because the user already has a replacement filter at the property 10 and would like to be reminded to change the filter when the user arrives at the property 10. Based on selection of the first snooze control 82, the mobile device 40 provides the input to the monitoring server 30 and the monitoring server 30 begins monitoring the location of the mobile device 40 only against the property region 70. Based on detecting that the location of the mobile device 40 has entered the property region 70, the monitoring server 30 sends a reminder to the mobile device 40 for the furnace filter alert.

The second snooze control 84 is a timing snooze control that causes the alert to be snoozed for a particular period of time. As shown, the second snooze control 84 causes the alert to be snoozed for twenty-four hours. The user may select the second snooze control 84 because the user does not want to purchase a furnace filter at this time, but plans to be located in the same region the next day and would like a reminder to purchase a furnace filter at that time. Based on selection of the second snooze control 84, the mobile device 40 provides the input to the monitoring server 30 and the monitoring server 30 begins monitoring for the time to be twenty-four hours from when the input was provided. Based on detecting that the time is twenty-four hours later, the monitoring server 30 sends a reminder to the mobile device 40 for the furnace filter alert.

The dismiss control 86 signifies that the user has addressed the furnace filter alert or would not like further reminders related to the furnace filter alert. Based on selection of the dismiss control 86, the mobile device 40 provides the input to the monitoring server 30 and the monitoring server 30 removes the furnace filter alert from the queue and stops monitoring for the furnace filter alert.

Although evaluation and provision of the furnace filter alert has primarily been described as being performed by the monitoring server 30 in FIGS. 1A-1C, other arrangements and distribution of functionality may be used. For example, after detecting that the furnace filter alert is needed, the monitoring server 30 may provide the furnace filter alert to the mobile device 40 immediately and the mobile device 40 may evaluate the geographic and timing conditions related to when the interface for the alert should be presented. In this example, the monitoring server 30 may send the geographic and timing conditions to the mobile device 40 (or the mobile device 40 may store the geographic and timing conditions in its own storage) and the mobile device 40 may evaluate its own location and timing to determine when the alert should be presented. In addition, the monitoring system 20 may detect the need for alerts, assess conditions for providing the alert, and communicate with the monitoring server 30 and/or the mobile device 40 to cause presentation of detected alerts at convenient locations and times.

Figure 2:
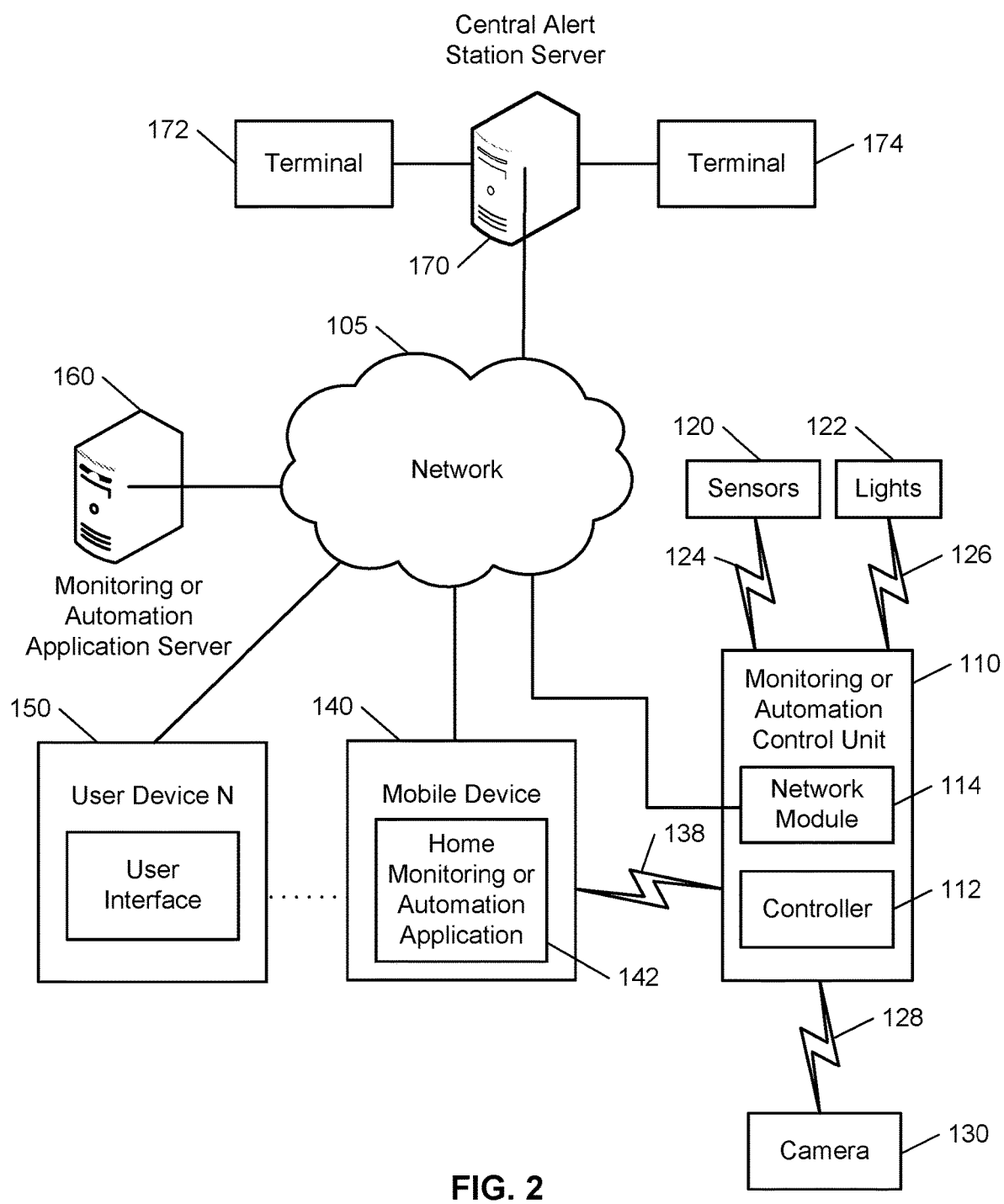
FIG. 2 illustrates an example system capable of providing location based and time sensitive monitoring system alerts.

FIG. 2 illustrates an example of a system configured to provide home monitoring or home automation and that can provide location based and time based alerts to user devices. The system comprises a network 105, a monitoring or automation system control unit 110, one or more user devices 140, 150, a monitoring or automation application server 160, and a central alert station server 170. In some examples, the network 105 facilitates communications between the monitoring or automation system control unit 110, the one or more user devices 140, 150, the monitoring or automation application server 160, and the central alert station server 170.

The network 105 is configured to enable exchange of electronic communications between devices connected to the network 105. For example, the network 105 may be configured to enable exchange of electronic communications between the monitoring or automation system control unit 110, the one or more user devices 140, 150, the monitoring or automation application server 160, and the central alert station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring or automation system control unit 110 includes a controller 112 and a network module 114. The controller 112 is configured to control a monitoring or automation system, for example, a home security system, or a home automation system, that includes the monitoring or automation system control unit 110. In some examples, controller 112 may include a processor or other control circuitry configured to execute instructions of a program that controls operation of a monitoring or automation system. In these examples, the controller 112 may be configured to receive input from sensors, detectors, or other devices included in the monitoring or automation system and to control operations of devices included in the home monitoring or automation system or other household devices, for example, a thermostat, appliance, lights, etc. For example, the controller 112 may be configured to control operation of the network module 114 included in the monitoring or automation system control unit 110.

The network module 114 is a communication device configured to exchange communications over a network 105. The network module 114 may be a wireless communication module configured to exchange wireless communications over a network 105. For example, the network module 114 may be a wireless communication device configured to exchange communications over a wireless data channel and/or a wireless voice channel. The wireless communication device may include one or more of a GSM module, a radio modem, a cellular transmission module, or any type of module configured to exchange communications in one of the following formats: GSM or GPRS, CDMA, EDGE or EGPRS, EV-DO or EVDO, UMTS, or IP.

The network module 114 may also be a wired communication module configured to exchange communications over a network 105 using a wired connection. For instance, the network module 114 may be a modem, a network interface card, or another type of network interface device. The network module 114 may be an Ethernet network card configured to enable the monitoring or automation system control unit 110 to communicate over a local area network and/or the Internet. The network module 114 may also be a voiceband modem configured to enable the alarm panel to communicate over the telephone lines of Plain Old Telephone Systems (POTS).

The monitoring or automation system that includes the monitoring or automation system control unit 110 may comprise one or more sensors and/or detectors. For example, the monitoring or automation system may include multiple sensors 120. The sensors 120 may include any of one or more contact sensors, motion sensors, vibration sensors, noise sensors, glass break sensors, pressure sensors, or any other type of sensor included in a monitoring or automation system. The sensors 120 may also include environmental sensors, such as temperature sensors, water or humidity sensors, rain sensors, wind sensors, light sensors, smoke detectors, carbon monoxide detectors, air quality sensors, etc. In some examples, the sensors 120 may further comprise one or more radio-frequency identification (RFID) sensors or other identification sensors that identify particular articles that include pre-assigned RFID tags.

The monitoring or automation system control unit 110 may communicate with sensors 120, light system 122, and/or camera 130 to achieve monitoring or automation. In practice, light system 122 can be any light or system of lights, and camera 130 may be any video/photographic camera or other type of optical sensing device configured to capture images. Sensors 120, light system 122, and/or camera 130 may operate based on commands received from the monitoring or automation system control unit 110. For example, sensors 120, light system 122, and/or camera 130 may be integrated or coordinated to perform functions relating to a home monitoring or home automation system.

The sensors 120, lights system 122, and camera 130 may communicate with controller 112 using communication links 124, 126, and/or 128. The communication links 124, 126, and/or 128 may be any wired or wireless data pathway configured to transmit signals from the sensors 120, the light system 122, and/or the camera 130 to the controller 112. The sensors 120, the light system 122, and/or the camera 130 may continuously transmit detected values to the controller 112, periodically transmit detected values to the controller 112, or transmit detected values to the controller 112 in response to a change in a detected value.

For example, the communication link 128 by which the camera 130 and controller 112 can communicate may include a local network. The camera 130 and the controller 112 may exchange data and commands over the local network. The local network may include, for example, an 802.11 "WiFi" wireless Ethernet, e.g., using low-power WiFi chipsets, other wireless local area network (WLAN), Z-Wave, ZigBee, Bluetooth, "Homeplug" or other "Powerline" networks that operate over AC network wiring, and/or a Category 5 (CAT5) or Category 6 (CAT6) wired Ethernet network.

The monitoring or automation application server 160 is an electronic device configured to provide monitoring or automation services by exchanging electronic communications with the monitoring or automation system control unit 110, the one or more user devices 140, 150, and the central alert station server 170 over the network 105. For example, the monitoring or automation application server 160 may be configured to monitor events, for example, events detected and resulting in an alert, generated by the monitoring or automation system control unit 110. In such an example, the monitoring or automation application server 160 may exchange electronic communications with the network module 114 included in the monitoring or automation system control unit 110 to receive information regarding events, for example, events that can result in an alert, detected by the monitoring or automation system control unit 110. The monitoring or automation application server 160 may also receive information regarding events, for example, events detected and resulting in an alert, from the one or more user devices 140, 150.

According to some examples, the monitoring or automation application server 160 may route alert data received from the network module 114 or the one or more user devices 140, 150 to the central alert station server 170. For example, the monitoring or automation application server 160 may transmit the alert data to the central alert station server 170 over a network 105.

The monitoring or automation application server 160 may store sensor and/or image data received from the monitoring or automation system and perform analysis of sensor and/or image data received from the monitoring or automation system. Based on the analysis performed, the monitoring or automation application server 160 may communicate with and control aspects of the monitoring or automation system control unit 110 or the one or more user device 140, 150.

The central alert station server 170 is an electronic device configured to provide monitoring or automation alert services by exchanging communications with the monitoring or automation system control unit 110, the one or more mobile devices 140, 150, and the monitoring or automation application server 160 over a network 105. For example, the central alert station server 170 may be configured to monitor alert events generated by the monitoring or automation system control unit 110. In this example, the central alert station server 170 may exchange communications with the network module 114 included in the monitoring or automation system control unit 110 to receive information regarding alert events detected by the monitoring or automation system control unit 110. The central alert station server 170 also may receive information regarding alert events from the one or more mobile devices 140, 150.

The central alert station server 170 is connected to multiple terminals 172 and/or 174. The terminals 172 and/or 174 may be used by one or more operators to process alert events, where operators may be human operators, automatic operator protocols, or a combination of automatic systems and human operators. For example, the central alert station server 170 may route alert data to the terminals 172 and 174 to enable an operator to process alert data. For instance, the controller 112 may control the network module 114 to transmit, to the central alert station server 170, alert data indicating that one or more sensors 120 detected a particular event. The central alert station server 170 may receive the alert data and route the alert data to the terminal 172 for processing by an operator associated with the terminal 172. The terminal 172 may output information associated with the alert event, for example, the type of alert, etc., and the operator may address alert based on the information.

According to some implementations, the terminals 172 and 174 may be mobile devices and/or devices designed for a specific function. Although FIG. 1 illustrates only two terminals for simplicity, actual implementations may include more or less terminals.

The one or more user devices 140, 150 are devices that host and display user interfaces. For example, the user device 140 may be a mobile device that hosts one or more native applications, such as a native home monitoring or home automation application 142. The user device 140 may be a cellular phone or a non-cellular locally networked device with a display. The user device 140 may include a cell phone, a smart phone, a tablet PC, a personal digital assistant ("PDA"), or any other portable device configured to communicate over a network and to display information. For example, implementations may include Blackberry-type device, such as those provided by Research in Motion), electronic organizers, iPhone-type device, such as those provided by Apple, iPod devices, such as those provided by Apple, other portable music players, other communication devices, and other handheld or portable electronic devices for gaming, communications, and/or data organization. The user device 140 may perform functions unrelated to the monitoring or automation system, such as placing personal telephone calls, playing music, playing videos, displaying pictures, browsing the Internet, maintaining an electronic calendar, and/or other operations.

The user device 140 may include a home monitoring or automation application 142. The home monitoring or automation application 142 refers to a software/firmware program running on the corresponding mobile device that enables the user interface and features described throughout. The user device 140 may load or install the home monitoring or automation application 142 based on data received over a network or data received from local media. The home monitoring or automation application 142 may operate on mobile device platforms, such as iPhone, iPod touch, Blackberry, Google Android, Windows Mobile, etc. The home monitoring or automation application 142 enables the user device 140 to receive and/or process data from the monitoring or automation system and/or alerts provided by the monitoring or automation system.

The user device 150 may be a general-purpose computer, for example, a desktop personal computer, a workstation, a laptop computer, etc., that is configured to communicate with the monitoring or automation application server 160 and/or the monitoring or automation system control unit 110 over a network 105. The user device 150 may be configured to display a user interface 152 that is generated by the user device 150 or generated by the monitoring or automation application server 160. For example, the user device 150 may be configured to display a user interface, for example a web page or other interactive interface, provided by the monitoring or automation application server 160 that enables a user to perceive images captured by the camera 130 and/or reports related to the monitoring or automation system. Although FIG. 1 illustrates two user devices 140, 150 for simplicity, actual implementations may include more or fewer user devices.

According to some implementations, the one or more user devices 140, 150 communicate with and/or receive monitoring or automation system data from the monitoring or automation system control unit 110 using a communication link 138. For instance, the one or more user devices 140, 150 may communicate with the monitoring or automation system control using 110 using various local wireless protocols such as WiFi, Bluetooth, Z-Wave, ZigBee, HomePlug (Ethernet over powerline), or wired protocols, such as Ethernet and USB, to connect the one or more user devices 140, 150 to local home monitoring or home automation equipment and/or devices. The one or more user devices 140, 150 may connect locally to the monitoring or automation system and its sensors and/or other devices. The local connection may improve the speed of status and control communications since communicating through a network 105 with a remote server, for example, the monitoring or automation application server 160 may be significantly slower.

Although the one or more user devices 140, 150 are shown as communicating with the monitoring or automation system control unit 110, the one or more user devices 140, 150 may communicate directly with the sensors and/or other devices controlled by the monitoring or automation system control unit 110. In some implementations, the one or more user devices 140, 150 may replace the monitoring or automation system control unit 110 and perform the functions of the monitoring or automation system control unit 110 for local monitoring or automation and/or long range/offsite communication. For example, the sensors and/or other devices may communicate directly with the one or more user devices 140, 150 and the one or more user devices 140, 150 may perform all alerting functionality, including evaluation of sensor, geographic, and timing conditions. In this example, a server may not be involved in the alerting at all.

According to other implementations, the one or more user devices 140, 150 receive monitoring or automation system data captured by the monitoring or automation system control unit 110 through a network 105. The one or more user devices 140, 150 may receive the data from the monitoring or automation system control unit 110 through a network 105 or the monitoring or automation application server 160 may relay data received from the monitoring or automation system control unit 110 to the one or more user devices 140, 150 through the network 105. To this end, the monitoring or automation application server 160 may facilitate communication between the one or more user devices 140, 150 and the monitoring or automation system.

In some implementations, the one or more user devices 140, 150 may be configured to determine whether the one or more user devices 140, 150 communicate with the monitoring system control unit 110 directly, for example, through link 138, or through the monitoring or automation application server 160, for example, through network 105, based on a location of the one or more user devices 140, 150. For instance, when the one or more user devices 140, 150 are located close to the monitoring or automation system control unit 110, the one or more user devices 140, 150 may use direct communication. When the one or more user devices 140, 150 are located far from the monitoring or automation control unit 110, the one or more user devices 140, 150 use communication through the monitoring or automation application server 160.

Although the one or more user devices 140, 150 are shown as being connected to a network 105, and are typically implemented as such, in some implementations, the one or more user devices 140, 150 are not connected to a network 105. In these instances, the one or more user devices 140, 150 communicate directly with one or more of the monitoring or automation system components and no network, for example, the Internet, connection or reliance on remote servers is needed.

According to some implementations, the one or more user devices 140, 150 are used in conjunction with only local sensors and/or local devices in a home monitoring or home automation system. In these implementations, the system 100 may only include the one or more user devices 140, 150, the sensors 120, a light system 122, and/or a camera 130. The one or more user devices 140, 150 may receive data directly from the sensors 120, light system 122, and/or camera 130. The one or more user devices 140, 150 may provide the appropriate interfaces and/or processing to provide alerts in response to the detection of particular events.

According to one or more implementations, the system 100 may further include network 105 in addition to sensors 120, a light system 122, and/or a camera 130 that are configured to communicate sensor and/or image data to one or more user devices 140, 150 over network 105, for example, the Internet, a cellular network, or any other network. In yet another implementation, the sensors 120, light system 122, a camera 130, and/or another component, are capable of changing the communication pathway amongst devices from a direct local pathway, such as when the one or more user devices 140, 150 are in close physical proximity to the sensors 120, light system 122, and/or camera 130 to a pathway over a network 105 when the one or more user devices 140, 150 are farther from sensors 120, a light system 122, and/or a camera 130. According to some examples, the system may leverage GPS information from one or more user devices 140, 150 to determine whether the one or more user devices 140, 150 are close enough to sensors 120, light system 122, and/or camera 130 to use a direct local pathway or if the one or more user devices 140, 150 are far enough from sensors 120, light system 122, camera 130, that a pathway over a network 105 is required. According to other examples, the system may leverage status communications, for example, pinging, between the one or more user devices 140, 150 and sensors 120, light system 122, and/or camera 130 to determine whether communication using a direct local pathway is possible. If communication using a direct local pathway is not possible, the one or more user devices 140, 150 may communicate with sensors 120, light system 122, and/or camera 130 using a pathway over network 105.

According to some implementations, the system may leverage GPS data or other location data from the one or more user devices 140, 150 to determine the proximity of user devices 140, 150 to locations relevant to an alert related to the home automation or monitoring system. For example the user devices 140, 150 may be capable of determining the distance from a particular relevant location to one or more user devices 140, 150 using GPS data or other location data. According to some implementations, a distance value used to determine if the one or more user devices 140, 150 are within proximity of a particular relevant location may be determined by the one or more user devices 140, 150, or may alternatively be transmitted to the one or more user devices 140, 150, for example, through network 105. According to some implementations, the one or more user devices 140, 150 may be capable of determining the locations of one or more relevant locations based on obtaining a set of one or more relevant locations from, for example, a mapping service, a source on the Internet, or any other source that is capable of providing the locations of relevant locations to the one or more user devices 140, 150. Additionally or alternatively, according to some examples, a set of relevant locations may be provided by a user of one or more user devices 140, 150, or may be provided to a home monitoring or automation system by one or more users or operators of the system, for example, using user devices 140, 150 or input provided to the server 160.

In addition to or as an alternative to GPS data, the mobile devices 140, 150 may use a "beacon" to determine location. The beacon may be a dedicated beacon or may be a non-dedicated beacon, such as a WiFi access point. Using the beacon to determine location may result in a more specific location, which may be used to enhance alerting. For instance, a beacon may be able to determine location in the same room as a furnace and a furnace filter alert may be generated any time the location is determined to be the same room as the furnace.

Additionally, according to some implementations, the system 100 may utilize one or more timers and/or clock functions to determine when alerts are presented to users, for example, timers and/or clocks associated with one or more user devices 140, 150. In some instances, alerts may be presented to users based on elapsed time, e.g., a number of hours or days since an alert event was detected, or based on a time of day, e.g., an hour of the day. Additionally or alternatively, alerts may be presented to users based on a combination of both time and location, as determined, for example, by GPS data using one or more user devices 140, 150. In some instances, a user may be provided a specific alert at a particular time of day, for example, at 6:00 PM, based on that time being a time when many users will be at home. In some instances, an alert may be presented to a user based on the alert taking place within some elapsed period of time, or a reminder alert may be sent after some elapsed period of time, for example, every 24 hours. In some instances, alerts may be provided to a user at one or more user devices 140, 150, based on a combination of location and time. For example, a system 100 comprising user devices 140, 150 may determine that a user is located in their home and that the current time of day is 6:00 PM, and may output an alert for an earlier detected event to a user based on detecting both of these criteria. As another example, one or more user devices 140, 150 associated with system 100 may output an alert to a user based on the location of the one or more user devices 140, 150 being in proximity of a location relevant to a particular alert, and further more based on an elapsed time or time of day. For instance, an alert notification may be presented to a user based on the location of one or more user devices 140, 150 being in proximity of a relevant location, and based on 24 hours having elapsed since the last notification output to a user that they are in proximity of a relevant location. Additionally or alternatively, an alert notification may be presented to a user based on the location of one or more user devices 140, 150 being in proximity of a relevant location, and based on the time of day being 4:00 PM, indicating that the user may be commuting home for the day, as opposed to, for example, commuting to work.

In some instances, a component of the system, such as a monitoring or automation application server 160, is capable of determining locations from a set of locations to identify as relevant locations relating to a particular alert or alerts. For example, the system may be capable of determining that a store that sells furnace filters should be identified as a relevant location related to an alert sent to one or more user devices that a furnace filter should be replaced. Relationships between alerts and relevant locations may be determined by any number of methods, for example, based on searching websites associated with particular locations or businesses that occupy particular locations to determine if the locations or businesses offer resources related to the alert, based on a user identifying specific locations as relevant to specific alerts, or based on alerts being categorized into categories of one or more alerts and associated with particular locations and/or categories of locations. While these represent some methods for associating alerts with relevant locations, these examples are not intended to be all inclusive and other methods are within the scope of this disclosure.

According to some implementations of the subject matter described herein, the one or more user devices 140, 150 may provide one or more interfaces that enable a user to provide input in response to receiving one or more alerts. For example, a user device 140, 150 may provide an alert to a user and may additionally provide options to a user to respond to the alert including, for example, an option for indicating that the user has addressed the subject of the alert, an option requesting the system to remind the user at another time, i.e., a "Snooze" option, and/or an option indicating that the user does not have the resources to address the subject of the alert, e.g., that the user does not have necessary replacement parts or the required knowledge to address the subject of an alert. In response to receiving an indication from a user with respect to an alert, the system may determine a status of the alert and may use this status and the user response to determine or alter future notifications related to the alert. In some instances, a user interaction indicating that an alert relating to one or more components of a system 100 has been addressed may cause the system 100 to reset, cancel, or otherwise acknowledge that the current alert has been addressed and that the system 100 should be able to detect new events resulting in new alerts at the one or more components. In some instances, a user interaction requesting a reminder at a later time, i.e., a selection of a "Snooze" option, may result in future reminders alerts being provided to the user, for example, using user devices 140, 150. According to some examples, reminder alerts may be presented to a user based on an amount of time after an initial alert, e.g., every 24 hours, based on the user being detected in a certain location, e.g., the next time the user comes home, or based on any other combination of time or location related to the user and/or the alert. In some instances, an interaction indicating that a user does not have the resources to address the subject of an alert may alter future reminder alerts or result in the system 100 providing additional alerts. For example, alerts presented in response to an indication that the user is unable to address an alert may include alerts that the user is in proximity of a relevant location for addressing the alert, such as in proximity of a store for purchasing necessary replacement parts. In practice, such interactions made at, for example, one or more user devices 140, 150 may be analyzed by monitoring or automation application server 160 and used to influence future alerts or reminders.

Additionally or alternatively to the interactions of a user influencing alerts of a system 100, such as a home monitoring or automation system, additional data provided by the monitoring or automation system control unit 110 may influence and/or trigger alerts presented by the system, such as alerts presented at user devices 140, 150. In some implementations, data obtained from one or more modules of the monitoring or automation system control unit 110, such as sensors 120, light system 122, and/or camera 130, may influence and/or trigger alerts. In some instances, data obtained from the one or more modules of the monitoring or automation system control unit 110 may indicate that an event has occurred that may result in an alert being sent to user devices 140, 150. For example, one or more modules of the monitoring or automation system control unit 110 may determine that a furnace filter is damaged or failing, and the monitoring or automation system control unit 110 may send data indicating that the furnace filter is damaged or failing. In response to receiving the data, the monitoring or automation application server 160 may generate and output an alert indicating that a furnace filter should be replaced. In some instances, the one or more modules of monitoring or automation system control unit 110 may detect additional information relating to a previous event, and may send additional data resulting in additional alerts or that may influence alerts. For example, one or more modules of the monitoring or automation system control unit 110 may determine a worsening state of an already damaged or failing furnace filter, and monitoring or automation system control unit 110 may send additional data indicating the worsening state. In response to receiving the data, the monitoring or automation application server 160 may generate a new alert or alter a current alert, for example, to indicate that the furnace filter condition is worsening and should be replaced as soon as possible.

Figure 3:
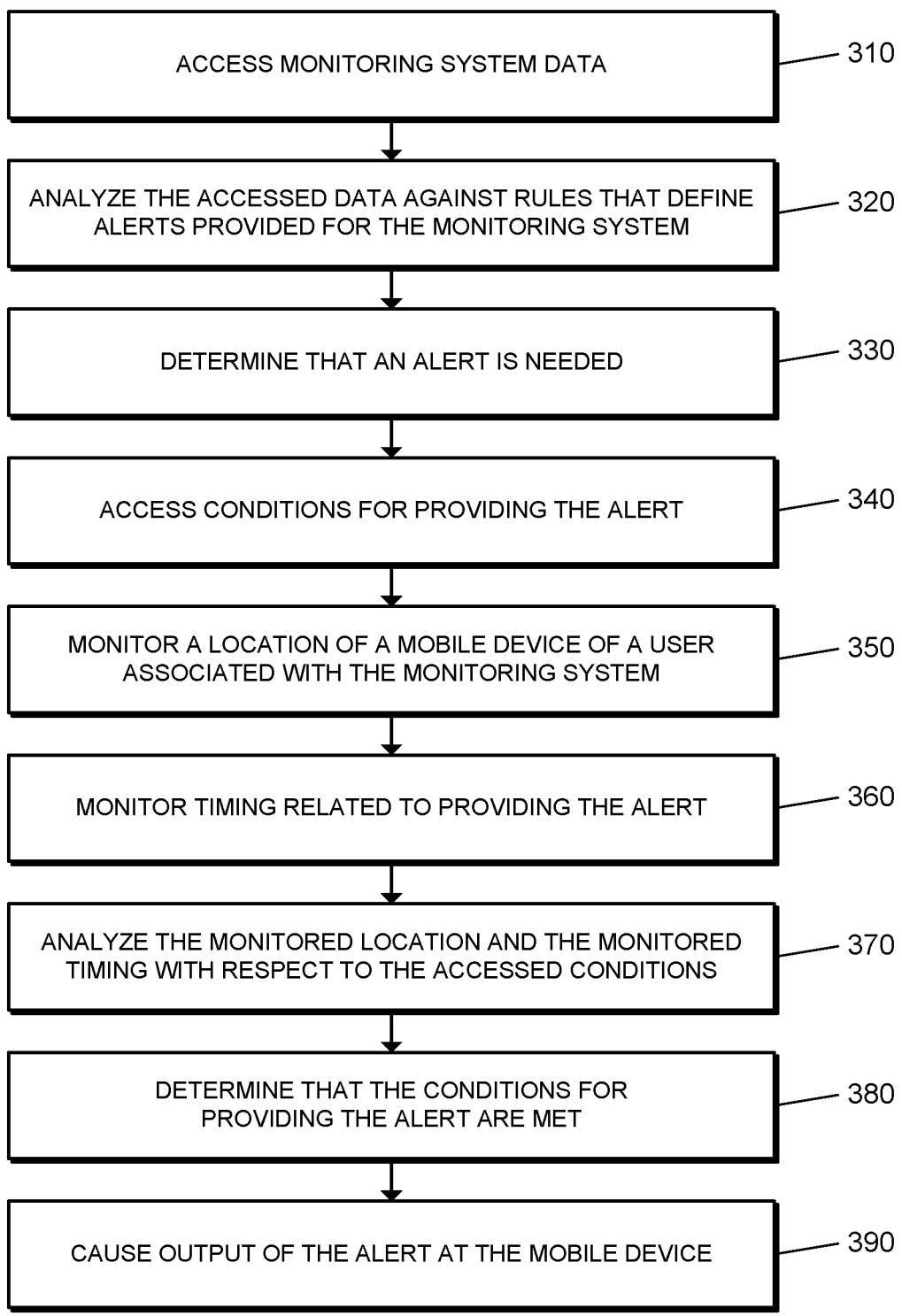
FIGS. 3, 6, and 8 are flow charts of example processes.
Figure 6:
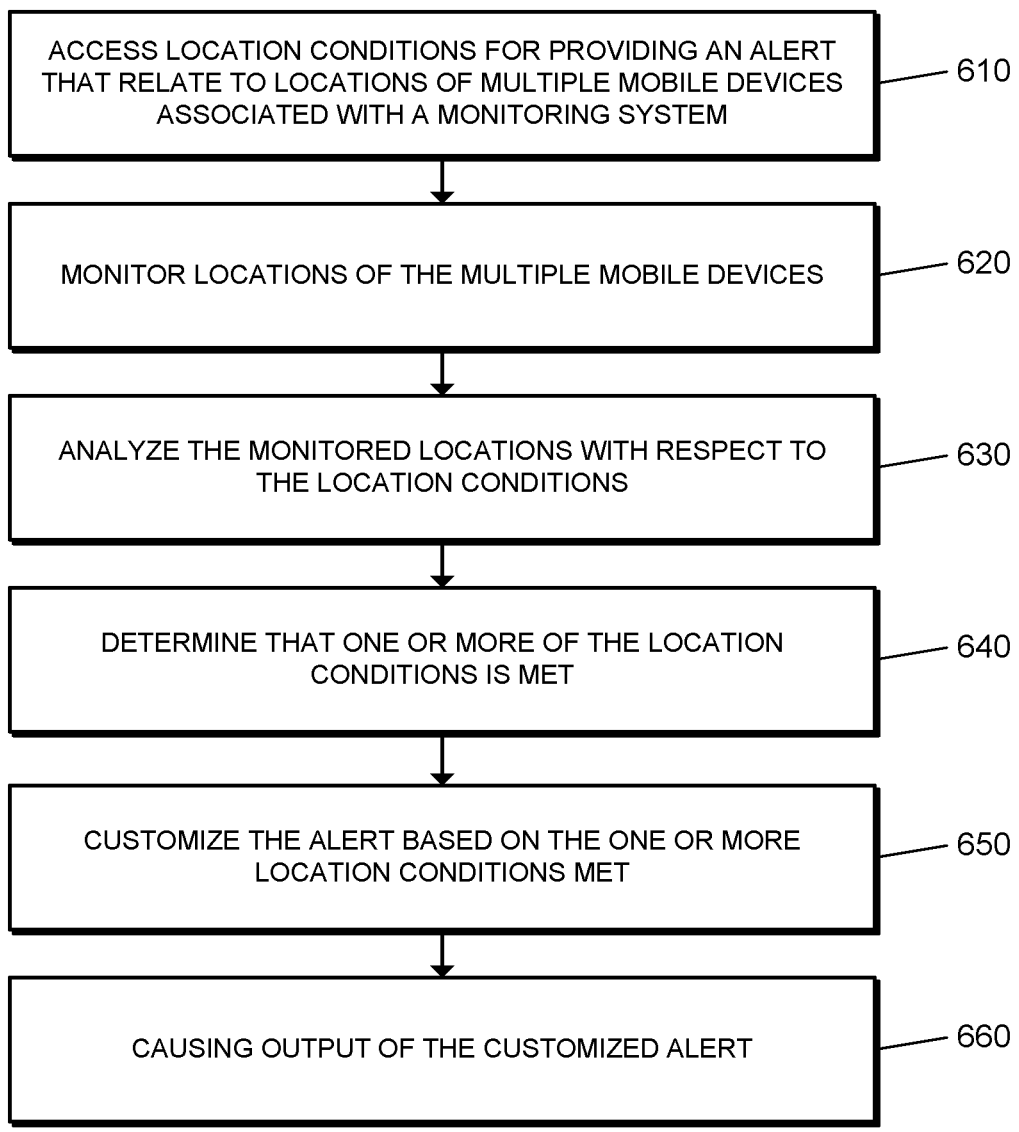
Figure 8:
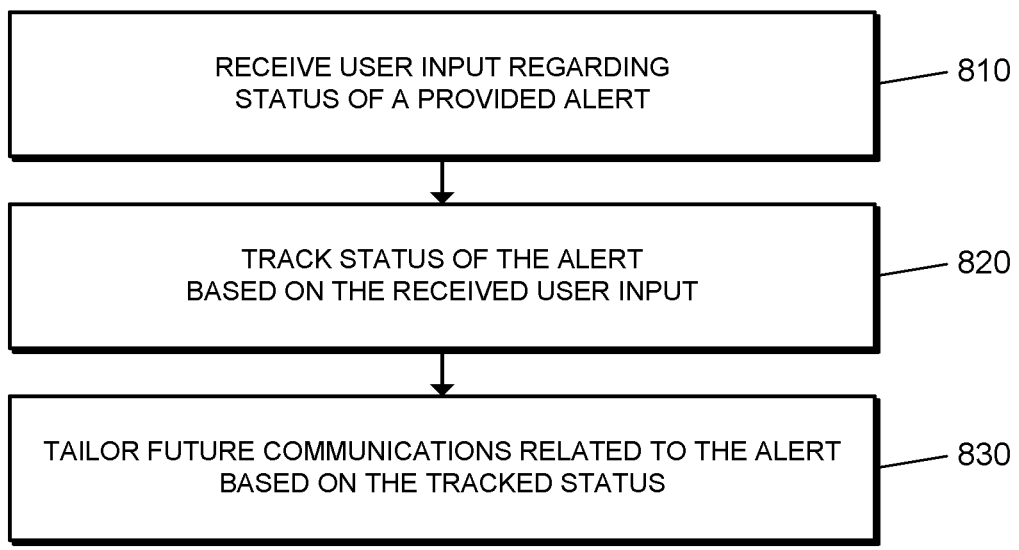

FIGS. 3, 6, and 8 illustrate example processes. The operations of the example processes are described generally as being performed by the system 100. The operations of the example processes may be performed by one of the components of the system 100 (e.g., the monitor control unit 110, the user devices 140, 150, the monitoring application server 160, etc.) or may be performed by any combination of the components of the system 100. In some implementations, operations of the example processes may be performed by one or more processors included in one or more electronic devices.

FIG. 3 illustrates an example process 300 for handling an alert for a monitoring system. The system 100 accesses monitoring system data collected by a monitoring system that is located in a property of a user (310). For example, the system 100 receives, over a network, data describing sensor events detected by sensors fixed at the property of the user. In this example, the sensor events may be contact sensor events detected by door and window sensors located at doors and windows of the property, motion sensor events detected by motion sensors located at the property, and any other type of sensor events detected by other types described throughout this disclosure. The system 100 receives all sensor events detected by the monitoring system, regardless of whether the monitoring system is in an armed state or an unarmed state when the sensor events are detected.

The system 100 analyzes the accessed data against one or more rules that define alerts provided for the monitoring system (320). For instance, the system 100 compares the accessed data against one or more conditions specified by the one or more rules.

The system 100 determines that an alert is needed based on the analysis of the accessed data against the one or more rules that define alerts provided for the monitoring system (330). For example, the system 100 determines that a comparison of the accessed data against one or more conditions specified by the one or more rules reveals that the accessed data meets the conditions of a rule. In this example, the system 100 determines that the alert is needed based on the determination that the conditions of a rule are met.

The system 100 accesses conditions for providing the alert (340). For instance, the system accesses the conditions from electronic storage. The accessed conditions may be associated with the alert needed or may be general conditions that apply to multiple or all alerts. The accessed conditions may define one or more geographic conditions that correspond to location of a mobile device of the user associated with the monitoring system and one or more timing conditions that correspond to timing related to providing the alert.

The system 100 monitors a location of a mobile device of a user associated with the monitoring system (350). For example, the system 100 periodically determines a geographic location of a mobile device of a user and tracks determined locations in electronic storage. In this example, the system 100 may periodically request geographic location information from the mobile device or the mobile device may be configured to automatically report its location every predefined period or any time the location changes. The location of the mobile device may be determined using any suitable technique, such as using global positioning system (GPS) data and/or communication signals (e.g., cellular triangulation).

In some implementations, the mobile device may monitor its own geographic location, evaluate its geographic location against one or more conditions, and report, to the monitoring server, its geographic location based on a determination that one or more conditions are met. In these implementations, the one or more conditions may define one or more geofences and the mobile device may report its location any time the mobile device enters any of the one or more geofences. For instance, rather than periodically reporting location data, the monitoring server may instruct the mobile device to report to the monitoring server based on the mobile device detecting that it is within one mile of a hardware store.

The system 100 monitors timing related to providing the alert (360). For instance, the system 100 tracks a time of day, how long the alert has been needed, and/or a time at which the most recent alert or reminder was provided. The system 100 may track any timing data related to provision of the alert.

The system 100 analyzes the monitored location and the monitored timing with respect to the accessed conditions (370). For example, the system 100 compares the monitored location and the monitored timing against the accessed conditions. In this example, the system 100 may compare the monitored location to one or more regions of interest to determine whether the monitored location falls within a region of interest or is located within a threshold distance of a particular location. The system 100 may compare the current time to a time window where an alert would be appropriate and compare the current time to communications sent regarding the alert to determine whether additional alerting is appropriate in accordance with the conditions.

The system 100 determines that the conditions for providing the alert are met based on the analysis of the monitored location and the monitored timing with respect to the accessed conditions (380). For example, the system 100 determines that a comparison of the monitored location and the monitored timing against the accessed conditions reveals that the accessed conditions are met. In this example, the system 100 may determine that the accessed conditions are met based on a determination that the mobile device is located within a region of interest at a time appropriate for providing an alert.

The system 100 causes output of the alert at the mobile device based on the determination that the conditions for providing the alert are met (390). For instance, the system 100 may cause output of the alert at the mobile device by sending an alert communication to the mobile device for display or by directly controlling the mobile device to display an alert interface corresponding to the alert.

FIG. 4 illustrates example conditions for providing alerts. As shown, a data structure 400 includes various rules and/or conditions for each of several types of alerts provided by a monitoring system. The data structure 400 may be accessed by the system 100 in determining whether alerts need to be provided and whether conditions for sending alerts are met. The data structure 400 includes four columns that define, for each alert, an alert type and conditions for providing an alert for the alert type. The data structure 400 includes a first column 410 for alert type, a second column 420 for one or more sensor conditions used to determine when an alert is needed for the alert type, a third column 430 for one or more geographic conditions used to determine where it is convenient to provide an alert for the alert type, and a fourth column 440 for one or more timing conditions used to determine when it is convenient to provide an alert for the alert type.

The data structure 400 includes four rows that define four types of alerts for the system 100. Although four types of alerts are shown, the system 100 may have more (perhaps, many more) or fewer types of alerts. A first row 450 defines conditions for a furnace filter replacement alert. As shown, the first row 450 indicates that the furnace filter replacement alert should be presented based on sensor data indicating air flow through the current filter below a threshold value, geographic data indicating that a user is within one mile of a hardware store, and timing data indicating that the hardware store is open for business. A second row 460 defines conditions for a smoke alarm battery alert. As shown, the second row 460 indicates that the smoke alarm battery alert should be presented based on sensor data indicating a measured battery level below a threshold value, geographic data indicating that the user is at a home where the smoke alarm is located, and timing data indicating that the time is between seven in the morning and ten at night. A third row 470 defines conditions for an inefficient thermostat alert. As shown, the third row 470 indicates that the inefficient thermostat alert should be presented based on sensor data indicating occupancy in a property does not match a thermostat schedule set for the thermostat (e.g., the thermostat is set to heat a home to a relatively high temperature when no one has occupied the home in two days), geographic data indicating that the user is away from home, and timing data indicating that the time is between nine in the morning and eight at night. A fourth row 480 defines conditions for an electronic lock malfunction alert. As shown, the fourth row 480 indicates that the electronic lock malfunction alert should be presented based on sensor data indicating a loss of communication with the electronic lock, geographic data indicating that the user is within one mile of a hardware store, and timing data that causes the geographic proximity to the hardware store to increase one mile each day the electronic lock malfunction alert has gone unresolved (e.g., increase to two miles from the hardware store on the second day, increase to three miles from the hardware store on the third day, etc.).

Figure 5A:
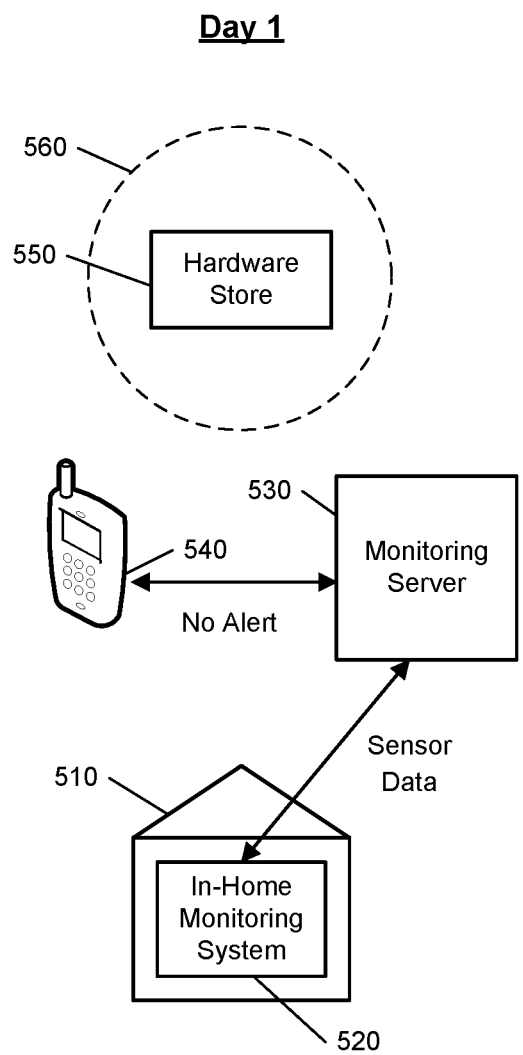
FIGS. 5A-5C illustrate an example of adjusting, over time, location conditions for providing an alert.
Figure 5B:
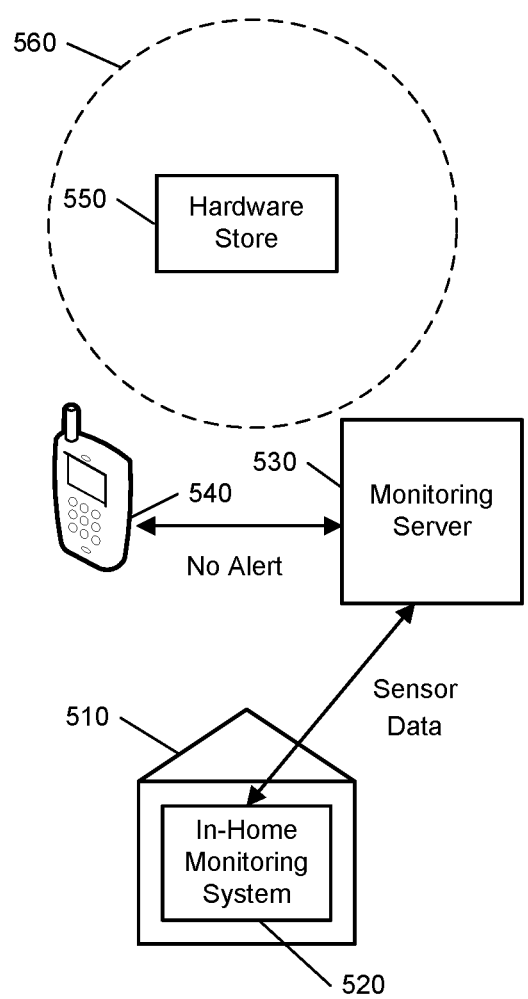
Figure 5C:
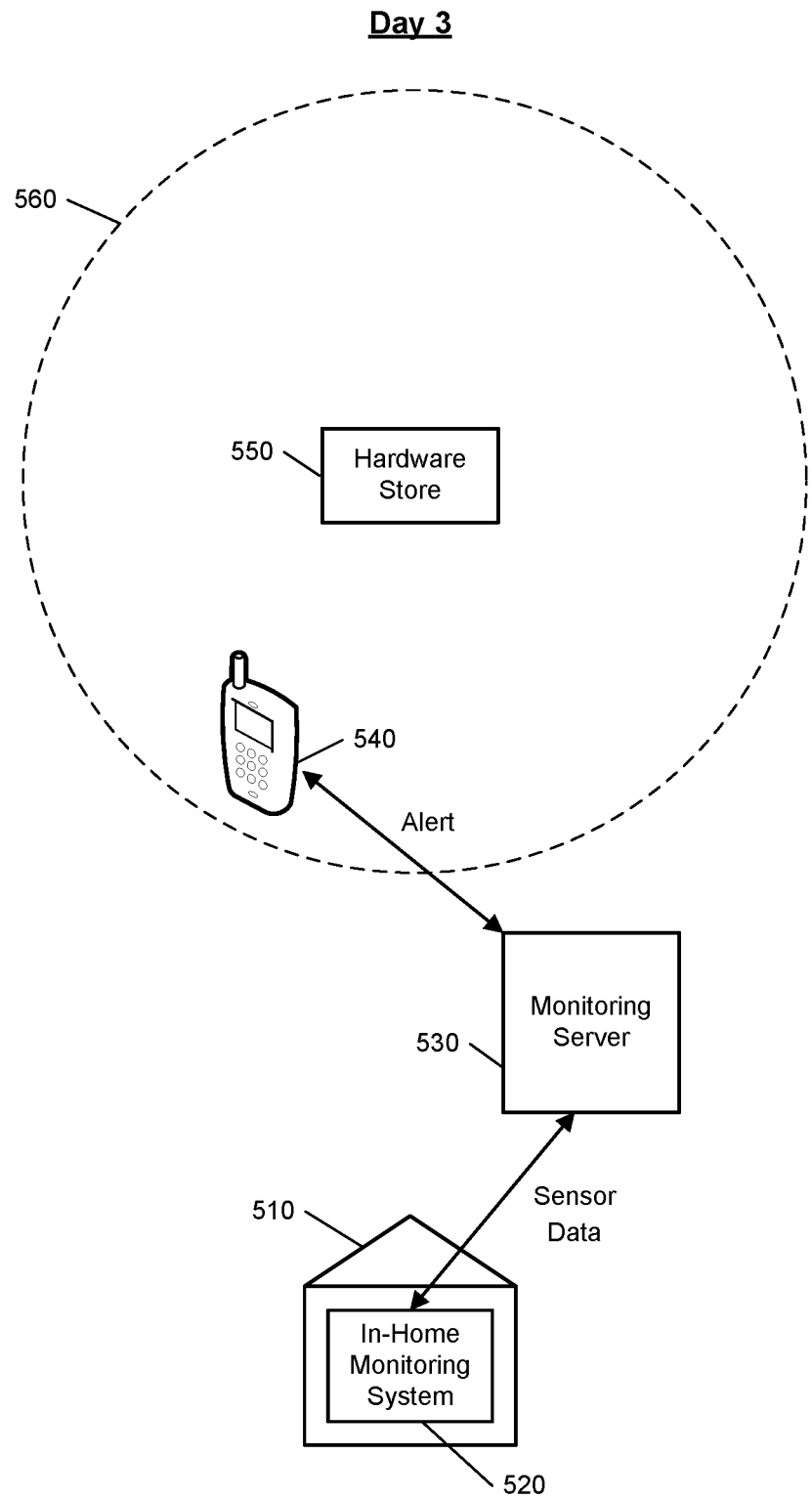

FIGS. 5A-5C illustrate an example of adjusting, over time, location conditions for providing an alert. As shown in FIG. 5A, a property 510 (e.g., a home) of a user is monitored by an in-home monitoring system 520 (e.g., in-home security system) that includes components that are fixed within the property 510. The monitoring system 520 includes a control panel that communicates over a short-range wired or wireless connection with sensors to receive sensor data descriptive of attributes of the property 510 including activity at the property 510. The control panel also communicates over a long-range wired or wireless connection with a monitoring server 530. The monitoring server 530 is located remote from the property 510 and manages the in-home monitoring system at the property 510, as well as other (and, perhaps, many more) in-home monitoring systems located at different properties that are owned by different users. The monitoring server 530 receives, from the control panel of the monitoring system 520, sensor data descriptive of attributes of the property 510 detected by the sensors included in the monitoring system 520.

In the example shown in FIG. 5A, the monitoring server 530 analyzes sensor data received from the monitoring system 520 against conditions for providing alerts for the monitoring system 520. The conditions may include one or more rules that specify when an alert for the monitoring system 520 is needed. The conditions also may specify when and where to send the alert based on the sensor data indicating that an alert is needed. The conditions may be defined as default settings at the monitoring server 530 and may be adjusted by the user of the monitoring system 520.

In the example shown in FIG. 5A, a mobile device 540 (e.g., smartphone) of the user is the target of alerts for the monitoring system 520. Although the mobile device 540 is described as the only target for alerts in FIG. 5A, multiple targets for alerts may be used and different types of devices may be used as targets. The monitoring server 530 is able to send alerts to the mobile device 540 over a network. The alerts may be provided in the form of an electronic message (e.g., an electronic mail message or an SMS message) or may be provided as alert communications through a mobile application operating on the mobile device 540. The monitoring server 530 communicates with the mobile device 540 and tracks a location of the mobile device 540 for use in evaluating geographic conditions for sending alerts.

In FIG. 5A, the monitoring server 530 receives, from the monitoring system 520, sensor data and determines that the sensor data indicates that an alert is needed. The alert may be any type of alert based on sensor data captured by the monitoring system 520. Based on a determination that the alert is needed, the monitoring server 530 accesses one or more geographic conditions and one or more timing conditions related to providing the alert. In this example, the one or more geographic conditions indicate that the alert should be provided to the user based on a location of the user being within a threshold distance of a hardware store 550. The hardware store 550 may be a particular hardware store (e.g., a hardware store preferred by the user) or any business designated as a hardware store in data accessible by the monitoring server 530. The one or more timing conditions indicate that the threshold distance to the hardware store 550 increases each day. The amount of increase may be linear (e.g., increases by a particular amount each day), may be exponential, or may follow any pattern of increase that provides the alert to the user in a convenient manner (e.g., increases by one mile each day and then removes of the threshold distance restriction after a period of time).

As shown in FIG. 5A, on the first day, the initial threshold distance from the hardware store results in a hardware store region 560. The monitoring server 530 compares the location of the mobile device 540 to the hardware store region 560 and, based on the comparison, determines that the mobile device 540 is located outside of the hardware store region 560. Accordingly, the monitoring server 530 determines that the one or more geographic conditions for the alert are not met, withholds the alert, and continues to monitor the geographic and timing conditions for the alert.

FIG. 5B illustrates the example shown in FIG. 5A at a second day after the monitoring server 530 determined that the alert was needed, but has not been provided due to failure of the geographic and timing conditions. In FIG. 5B, the monitoring server 530 has increased the hardware store region 560 in accordance with the one or more timing conditions. The monitoring server 530 compares the location of the mobile device 540 to the increased hardware store region 560 and, based on the comparison, determines that the mobile device 540 is located outside of the hardware store region 560. Accordingly, the monitoring server 530 determines that the one or more geographic conditions for the alert are not met, withholds the alert, and continues to monitor the geographic and timing conditions for the alert.

FIG. 5C illustrates the example shown in FIGS. 5A and 5B at a third day after the monitoring server 530 determined that the alert was needed, but has not been provided due to failure of the geographic and timing conditions. In FIG. 5C, the monitoring server 530 has increased the hardware store region 560 in accordance with the one or more timing conditions. The monitoring server 530 compares the location of the mobile device 540 to the increased hardware store region 560 and, based on the comparison, determines that the mobile device 540 is located within the hardware store region 560. Accordingly, the monitoring server 530 determines that the one or more geographic conditions for the alert are met and provides the alert to the mobile device 540. Although the mobile device 540 was located the same distance from the hardware store 550 in each of the three days, the mobile device 540 was only alerted on the third day due to the increase in size of the hardware store region 560. In this regard, the monitoring server 530 has balanced the convenience of the user in handling the alert and the need to alert the user to the situation at the property 510 by increasing the threshold distance from the hardware store 550 each day.

FIG. 6 illustrates an example process 600 for handling an alert for a monitoring system based on locations of multiple users associated with the monitoring system. The system 100 accesses location conditions for providing an alert that relate to locations of multiple mobile devices associated with the monitoring system (610). For example, the system 100 uses techniques similar to those described above with respect to reference numeral 340 to access the location conditions. In this example, the accessed location conditions relate to multiple mobile devices and may specify conditions that pertain to the location of any one of the multiple mobile devices or conditions that pertain to locations of more than one of the multiple mobile devices in combination.

The system 100 monitors locations of the multiple mobile devices (620). For instance, the system 100 uses techniques similar to those described above with respect to reference numeral 350 to monitor locations of the multiple mobile devices. The system 100 monitors each mobile device using techniques similar to those described above with respect to reference numeral 350 and compares results of monitoring each mobile device individually.

The system 100 analyzes the monitored locations with respect to the location conditions (630). For example, the system 100 compares the monitored locations to one or more regions of interest specified by the location conditions. In this example, the system 100 determines whether each mobile device is located in a region of interest based on the comparison.

The system 100 determines that one or more of the location conditions is met (640). For instance, the system 100 determines that at least one of the multiple mobile devices is located in a region of interest. In some cases, the system 100 only determines that the geographic conditions are met when multiple mobile devices are located in a region of interest (e.g., the same region of interest or different regions of interest).

The system 100 customizes the alert based on the one or more location conditions met (650). For example, the system 100 customizes the content of the alert based on which location conditions are met. In this example, the system 100 may provide the location of one or more of the mobile devices in the alert with a description of how one or more of the mobile devices may be able to help address the alert in an efficient manner. In addition, the system 100 may customize the alert by selecting one or more recipients of the alert based on which location conditions are met.

The system 100 causes output of the customized alert (660). For instance, the system 100 uses techniques similar to those described above with respect to reference numeral 390 to cause output of the customized alert.

Figure 7A:
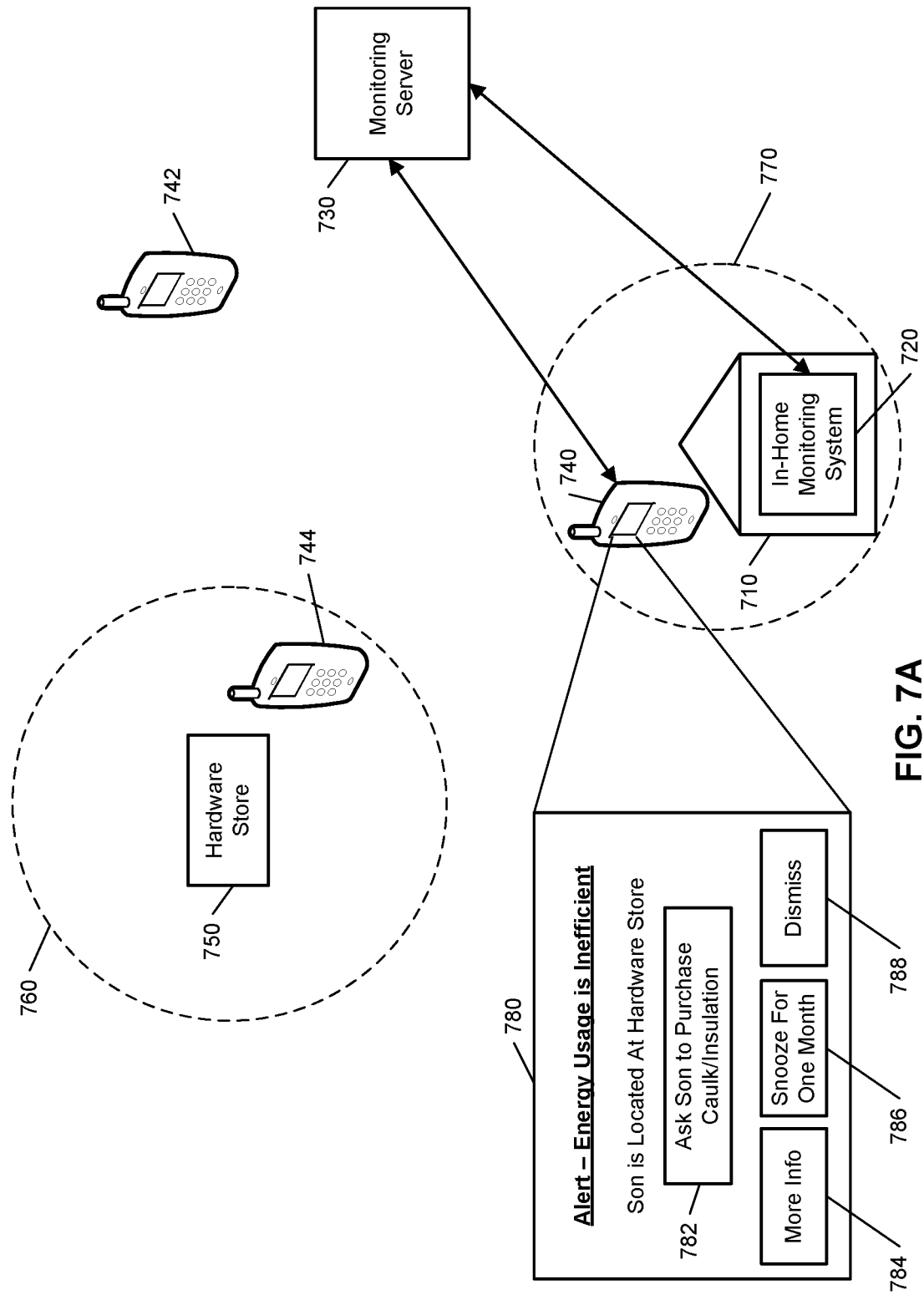
FIGS. 7A and 7B illustrate examples of providing of an alert based on locations of multiple mobile devices associated with a monitoring system.
Figure 7B:
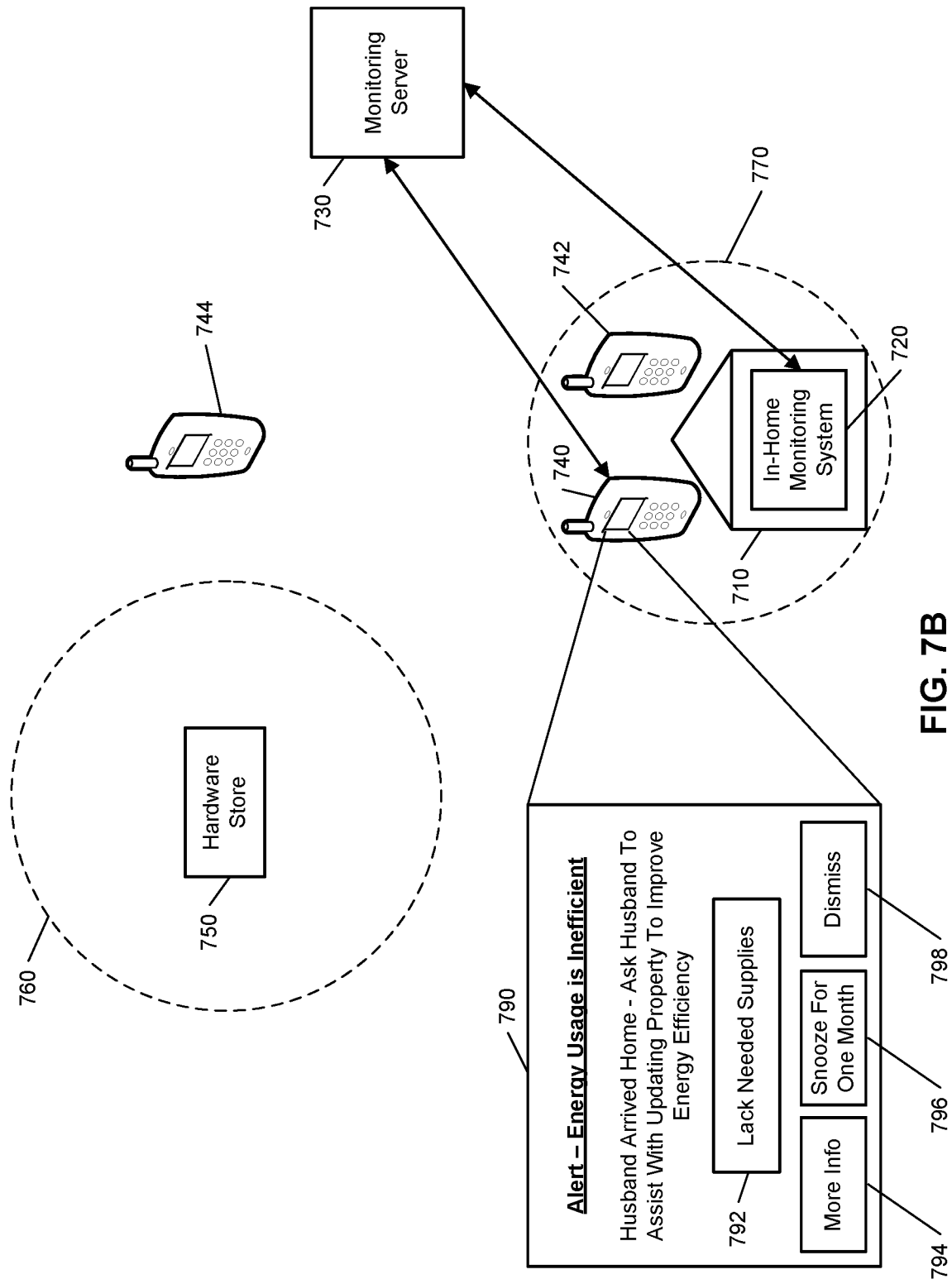

FIGS. 7A and 7B illustrate examples of providing of an alert based on locations of multiple mobile devices associated with a monitoring system. As shown in FIG. 7A, a property 710 (e.g., a home) of a user is monitored by an in-home monitoring system 720 (e.g., in-home security system) that includes components that are fixed within the property 710. The monitoring system 720 includes a control panel that communicates over a short-range wired or wireless connection with sensors to receive sensor data descriptive of attributes of the property 710 including activity at the property 710. The control panel also communicates over a long-range wired or wireless connection with a monitoring server 730. The monitoring server 730 is located remote from the property 710 and manages the in-home monitoring system at the property 710, as well as other (and, perhaps, many more) in-home monitoring systems located at different properties that are owned by different users. The monitoring server 730 receives, from the control panel of the monitoring system 720, sensor data descriptive of attributes of the property 710 detected by the sensors included in the monitoring system 720.

In the example shown in FIG. 7A, the monitoring server 730 analyzes sensor data received from the monitoring system 720 against conditions for providing alerts for the monitoring system 720. The conditions may include one or more rules that specify when an alert for the monitoring system 720 is needed. The conditions also may specify when and where to send the alert based on the sensor data indicating that an alert is needed. The conditions may be defined as default settings at the monitoring server 730 and may be adjusted by the user of the monitoring system 720.

In the example shown in FIG. 7A, multiple mobile devices 740, 742, and 744 (e.g., smartphones) are associated with the monitoring system 720. The mobile device 740 may be associated with a mom user, the mobile device 742 may be associated with a dad user, and the mobile device 744 may be associated with a son user. The monitoring server 730 is able to send alerts to one or more of the multiple mobile devices 740, 742, and 744 over a network. For instance, the mobile device 740 may be designated to receive all alerts for the monitoring system 720 or one or more alerting rules may define which of the multiple mobile devices 740, 742, and 744 is alerted given the specific set of conditions. The monitoring server 730 communicates with the multiple mobile devices 740, 742, and 744 and tracks locations of the multiple mobile devices 740, 742, and 744 for use in evaluating geographic conditions for sending alerts.

In FIG. 7A, the monitoring server 730 receives, from the monitoring system 720, sensor data and determines that the sensor data indicates that an alert is needed. The alert may be any type of alert based on sensor data captured by the monitoring system 720. Based on a determination that the alert is needed, the monitoring server 730 accesses one or more geographic conditions and one or more timing conditions related to providing the alert. In this example, the one or more geographic conditions relate to geographic proximity to a hardware store 750 and geographic proximity to the property 710. In this regard, the monitoring server 730 defines a hardware store region 760 for the geographic conditions related to geographic proximity to the hardware store 750 and a property region 770 for the geographic conditions related to geographic proximity to the property 710.

The monitoring server 730 compares the locations of the multiple mobile devices 740, 742, and 744 to the hardware store region 760 and the property region 770 and, based on the comparisons, determines that the mobile device 740 is located outside of the hardware store region 760 and within the property region 770, the mobile device 742 is located outside of both the hardware store region 760 and the property region 770, and the mobile device 744 is located within the hardware store region 760 and outside of the property region 770. Based on the determinations of how the geographic locations of the multiple mobile devices 740, 742, and 744 map to the hardware store region 760 and the property region 770, the monitoring server 730 determines to send an alert to the mobile device 740. In some examples, the geographic conditions may specify that the mobile device 740 is to receive an alert any time one of the multiple mobile devices 740, 742, and 744 is located in the hardware store region 760. In other examples, the geographic conditions may specify that the mobile device 740 is to receive an alert any time one of the mobile devices 742 and 744 is located in the hardware store region 760 and the mobile device 740 is located in the property region 770. In yet other examples, the geographic conditions may specify that an alert is sent to the mobile device in the property region 770 based on at least one of the multiple mobile devices 740, 742, and 744 being located in the hardware store region 760 and at least one of the multiple mobile devices 740, 742, and 744 being located in the property region 770. In any of these examples, as shown in FIG. 7A, the monitoring server 730 sends an alert to the mobile device 740, but not to the mobile devices 742 and 744.

The mobile device 740 receives the alert and displays an alert interface 780. The alert interface 780 includes a description of the alert (e.g., Alert—Energy Usage is Inefficient) and information that enables the mom user to determine why the alert was sent and/or determine how to efficiently handle the alert (e.g., Son is Located At Hardware Store). The alert interface 780 also includes controls 782, 784, 786, and 788 that enable the mom user to handle the alert. The control 782 allows the mom user to request that the son user take action that may be helpful in addressing the alert (e.g., Purchase Caulk/Insulation). Selection of the control 782 may cause the mobile device 740 to send, to the mobile device 744, a description of the alert and an action that the mom user would like the son user to take to address the alert (e.g., Purchase Caulk/Insulation). The control 784 allows the mom user to obtain more information describing what sensor data is being used to determine that energy usage is inefficient. The control 786 allows the mom user to snooze the alert for one month at which time the monitoring server 730 sends the mobile device 740 a reminder for the alert. The control 788 allows the mom user to dismiss the alert.

FIG. 7B illustrates the example shown in FIG. 7A at a later time at which the mobile devices 742 and 744 have changed location. In this example, the mobile device 742 of the dad user has moved to the property region 770 with the mobile device 740 of the mom user and the mobile device 744 of the son user has moved to a location outside of the hardware store region 760 and the property region 770. Based on the locations shown in FIG. 7B, the monitoring server 730 determines to send an alert to the mobile device 740 in accordance with different geographic conditions than those that resulted in the alert in FIG. 7A. In some examples, the geographic conditions may specify that the mobile device 740 is to receive an alert any time one of the multiple mobile devices 740, 742, and 744 is located in the property region 770. In other examples, the geographic conditions may specify that the mobile device 740 is to receive an alert any time one of the mobile devices 742 and 744 is located in the property region 770 and the mobile device 740 also is located in the property region 770. In yet other examples, the geographic conditions may specify that an alert is sent to a mobile device that is first located in the property region 770 based on at least two of the multiple mobile devices 740, 742, and 744 being located in the property region 770. In any of these examples, as shown in FIG. 7B, the monitoring server 730 sends an alert to the mobile device 740, but not to the mobile devices 742 and 744.

The mobile device 740 receives the alert and displays an alert interface 790. The alert interface 790 includes a description of the alert (e.g., Alert—Energy Usage is Inefficient) and information that enables the mom user to determine why the alert was sent and/or determine how to efficiently handle the alert (e.g., Husband Arrived Home—Ask Husband To Assist With Updating Property To Improve Energy Efficiency). The alert interface 790 also includes controls 792, 794, 796, and 798 that enable the mom user to handle the alert. The control 792 allows the mom user to indicate that the alert cannot be addressed because the mom user lacks the supplies needed to address the alert (e.g., the son user failed to purchase caulk/insulation in FIG. 7A). Selection of the control 792 may cause the mobile device 740 to send, to the monitoring server 730, an indication that the mom user lacks the supplies needed to address the alert and the monitoring server 730 may update alerting settings to tailor future alerts or reminders to those directed to obtaining supplies for addressing the alert. For instance, based on receiving the indication from the mobile device 740, the monitoring server 730 may start monitoring only geographic conditions related to the hardware store region 760 and stop providing alerts related to the property region 770. The control 794 allows the mom user to obtain more information describing what sensor data is being used to determine that energy usage is inefficient. The control 796 allows the mom user to snooze the alert for one month at which time the monitoring server 730 sends the mobile device 740 a reminder for the alert. The control 798 allows the mom user to dismiss the alert.

By monitoring the locations of the multiple mobile devices 740, 742, and 744 in FIGS. 7A and 7B, the monitoring server 730 may provide alerts that take advantage of the collective ability of multiple users to address the alert. In this regard, the monitoring server 730 does not place all of the burden on a single user and tracks multiple users in a manner that may handle the alert most efficiently.

FIG. 8 illustrates an example process 800 for handling an alert for a monitoring system based on tracked status of the alert reported by a user. The system 100 receives user input regarding status of a provided alert (810). For example, the system 100 receives, from a mobile device of a user, input describing whether or not the alert has been resolved. In this example, if the alert has not been resolved, the system 100 receives additional information related to a stage of handling of the alert. The stage of handling of the alert may indicate that nothing has been completed, supplies are still needed, supplies have been purchased, and/or a portion of activities needed to satisfy the alert have been completed.

The system 100 tracks status of the alert based on the received user input (820). For example, the system 100 stores the status of the alert in electronic storage in association with the alert and tracks updates in the status over time until the alert has been completely resolved.

The system 100 tailors future communications related to the alert based on the tracked status (830). For example, the system 100 tailors future reminders and alerts based on the tracked status. In this example, the system 100 may have first geographic conditions related to reminding the user to obtain supplies to address the alert (e.g., conditions related to proximity to a hardware store) and second geographic conditions related to reminding the user to complete the action to address the alert (e.g., conditions related to proximity to a property where the components giving rise to the alert are located). The system 100 may stop monitoring the first geographic conditions and only monitor the second geographic conditions based on the status indicating that the supplies have been purchased. Based on the status indicating that the supplies have not been purchased, the system 100 may temporarily stop monitoring the second geographic conditions and only monitor the first geographic conditions until the status has changed to indicate that the supplies have been purchased. In response to the status change, the system 100 may stop monitoring the first geographic conditions and only monitor the second geographic conditions.

In some implementations, the system 100 takes other actions related to the alert based on the tracked status. In these implementations, the system 100 may display information that may be helpful to the user in addressing the alert (e.g., instructions on the steps needed to address or evaluate the alert) and/or may direct the user to companies that offer services that may be helpful to the user in addressing the alert (e.g., direct the user to an online retailer that sells supplies needed to address the alert and/or direct the user to a company that provides services that may be helpful in addressing or evaluating the alert).

Figure 9:
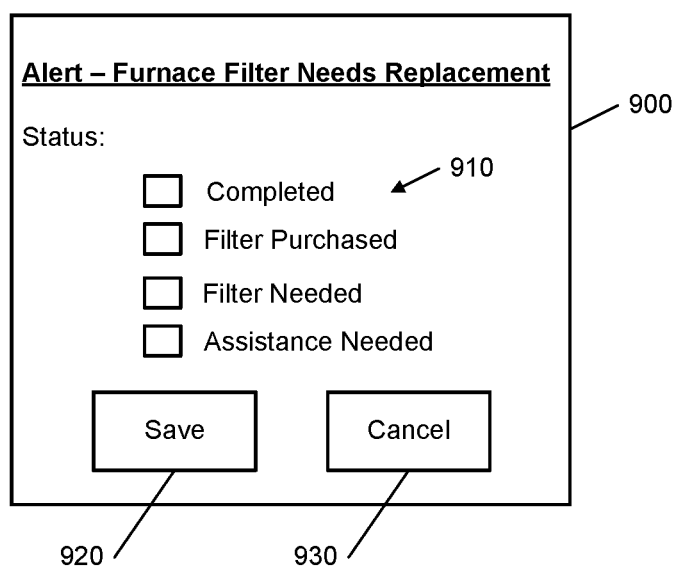
FIG. 9 illustrates an example interface for receiving user input regarding status of an alert.

FIG. 9 illustrates an example interface 900 for receiving user input regarding status of an alert. The interface 900 includes a description of the alert (e.g., Alert—Furnace Filter Needs Replacement), a status input section 910 that receives user input descriptive of the status of the alert, a save control 920 that causes the input provided in the status input section 910 to be saved, and a cancel control 930 that causes the interface 900 to be cancelled without updating the status of the alert. The status input section 910 enables a user to designate that the alert has been completed, that a filter has been purchased, that a filter is needed, and/or that assistance is needed in addressing the alert. Based on receiving input that the status of the alert is completed, the system 100 stops tracking the alert and designates the alert as completed.

Based on receiving input that the status of the alert is filter purchased, the system 100 tailors future actions to reminding the user to replace the filter, rather than obtain a filter. For example, the system 100 may tailor future alerts or reminders to those directed to installing a filter, rather than purchasing a filter. In this example, the system 100 may only provide alerts for furnace filter replacement based on detecting user proximity to the property and stop providing other alerts, such as alerts based on detecting user proximity to a hardware store.

Based on receiving input that the status of the alert is filter needed, the system 100 tailors future actions to assisting the user obtain a filter needed to satisfy the alert. For example, the system 100 may tailor future alerts or reminders to those directed to purchasing a filter. In this example, the system 100 may only provide alerts for furnace filter replacement based on detecting user proximity to a hardware store and stop providing other alerts, such as alerts based on detecting user proximity to the property. In some implementations, the system 100 may take other action to assist the user in obtaining a filter. In these implementations, the system 100 may, in response to receiving user input indicating a filter needed status, display a website of one or more retailers that sell appropriate filters online for delivery.

Based on receiving input that the status of the alert is assistance needed, the system 100 tailors future actions to assisting the user with filter replacement. For example, the system 100 may tailor future alerts or reminders to those directed to assisting the user perform a filter replacement. In this example, the system 100 may only provide alerts for furnace filter replacement based on detecting multiple users at the property and stop providing alerts when only the user is detected at the property. In some implementations, the system 100 may take other action to assist the user in replacing a filter. In these implementations, the system 100 may, in response to receiving user input indicating that assistance is needed, display information describing how filters are changed and/or contact information for repairmen that perform filter replacement.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
determining a location of a device that is associated with a property;
determining, using the location of the device and sensor data from one or more sensors located at the property, that i) the sensor data satisfies one or more sensor data criteria of a monitoring system rule that defines an alert from a plurality of alerts and ii) the location of the device satisfies a location criteria of the monitoring system rule, the location of the device comprising different data than the sensor data;
in response to determining that i) the sensor data satisfies the one or more sensor data criteria of the monitoring system rule that defines the alert from the plurality of alerts and ii) the location of the device satisfies the location criteria of the monitoring system rule, causing presentation, by the device, of a message a) from the alert and b) that includes information about the property;
tracking a status of the alert; and
after causing presentation, by the device, of the message from the alert:
preventing presentation of other alerts on the device until the tracking has been canceled;
determining whether the device received user input responsive to the message; and
determining, using a result of the determination whether the device received user input responsive to the message, whether to i) maintain the prevention of presentation of other alerts and continue tracking the status of the alert or ii) canceling tracking the status of the alert and allow presentation of other alerts on the device.

2. The method of claim 1, wherein:
determining the location of the device comprises receiving, by one or more computers and from the device, first data representing the location of the device determined using one or more sensors included in the device;
determining the alert comprises retrieving, by the one or more computers and from a database, second data representing the alert that includes data for the message; and
causing presentation of the message comprises providing, by the one or more computers and to the device and using the second data, instructions to cause the device to present the message.

3. The method of claim 1, wherein:
determining the location of the device comprises determining, by the device and using sensor data from the device, the location of the device;
determining the alert comprises:
sending, to one or more computers separate from the device, first data representing the location; and
in response to sending the first data representing the location, receiving, from the one or more computers, second data representing the alert that includes data for the message; and
causing presentation of the message comprises presenting, by the device and using the second data, the message from the alert.

4. The method of claim 1, wherein determining the alert is responsive to determining the location of the device.

5. The method of claim 1, comprising:
after causing presentation, by the device, of the message from the alert:
receiving user input responsive to the message that indicates that resources to address a subject of the alert are currently unavailable; and
in response to receiving the user input responsive to the message that indicates that resources to address the subject of the alert are currently unavailable, updating one or more criteria for the alert that include the location criteria and the one or more sensor data criteria.

6. The method of claim 1, comprising:
after causing presentation, by the device, of the message from the alert:
receiving user input responsive to the message that indicates that resources to address a subject of the alert are currently unavailable; and
in response to receiving the user input responsive to the message that indicates that resources to address the subject of the alert are currently unavailable, updating one or more criteria for another alert different than the alert that indicate when the other alert should be presented.

7. The method of claim 1, wherein causing presentation, by the device, of the message comprises causing presentation, by the device, of the message a) from the alert and b) that includes information about an event associated with the alert and the property.

8. The method of claim 1, comprising:
detecting information relating to previous events; and
determining that the information relating to the previous events satisfies a similarity threshold for the current alert, wherein causing presentation of the message comprises:
in response to determining that the information relating to the previous events satisfies the similarity threshold for the current alert, causing presentation, by the device, of the message a) from the alert b) that includes information about the property, and c) that includes data for the information relating to the previous events.

9. A system comprising one or more computers and one or more storage devices on which are stored instructions that are operable, when executed by the one or more computers, to cause the one or more computers to perform operations comprising:
determining a location of a device that is associated with a property;
determining, using the location of the device and sensor data from one or more sensors located at the property, that i) the sensor data satisfies one or more sensor data criteria of a monitoring system rule that defines an alert from a plurality of alerts and ii) the location of the device satisfies a location criteria of the monitoring system rule, the location of the device comprising different data than the sensor data;
in response to determining that i) the sensor data satisfies the one or more sensor data criteria of the monitoring system rule that defines the alert from the plurality of alerts and ii) the location of the device satisfies the location criteria of the monitoring system rule, causing presentation, by the device, of a message a) from the alert and b) that includes information about the property;
tracking a status of the alert; and
after causing presentation, by the device, of the message from the alert:
preventing presentation of other alerts on the device until the tracking has been canceled;
determining whether the device received user input responsive to the message; and
determining, using a result of the determination whether the device received user input responsive to the message, whether to i) maintain the prevention of presentation of other alerts and continue tracking the status of the alert or ii) canceling tracking the status of the alert and allow presentation of other alerts on the device.

10. The system of claim 9, wherein:
determining the location of the device comprises receiving, by one or more computers and from the device, first data representing the location of the device determined using one or more sensors included in the device;
determining the alert comprises retrieving, by the one or more computers and from a database, second data representing the alert that includes data for the message; and
causing presentation of the message comprises providing, by the one or more computers and to the device and using the second data, instructions to cause the device to present the message.

11. The system of claim 9, wherein:
determining the location of the device comprises determining, by the device and using sensor data from the device, the location of the device;
determining the alert comprises:

sending, to one or more computers separate from the device, first data representing the location; and in response to sending the first data representing the location, receiving, from the one or more computers, second data representing the alert that includes data for the message; and causing presentation of the message comprises presenting, by the device and using the second data, the message from the alert.

12. The system of claim 9, wherein determining the alert is responsive to determining the location of the device.

13. The system of claim 9, the operations comprising:

after causing presentation, by the device, of the message from the alert:

receiving user input responsive to the message that indicates that resources to address a subject of the alert are currently unavailable; and in response to receiving the user input responsive to the message that indicates that resources to address the subject of the alert are currently unavailable, updating one or more criteria for the alert that include the location criteria.

14. The system of claim 9, the operations comprising:

after causing presentation, by the device, of the message from the alert:

receiving user input responsive to the message that indicates that resources to address a subject of the alert are currently unavailable; and in response to receiving the user input responsive to the message that indicates that resources to address the subject of the alert are currently unavailable, updating one or more criteria for another alert different than the alert that indicate when the other alert should be presented.

15. The system of claim 9, wherein causing presentation, by the device, of the message comprises causing presentation, by the device, of the message a) from the alert and b) that includes information about an event associated with the alert and the property.

16. The system of claim 9, the operations comprising:

detecting information relating to previous events; and determining that the information relating to the previous events satisfies a similarity threshold for the current alert, wherein causing presentation of the message comprises:

in response to determining that the information relating to the previous events satisfies the similarity threshold for the current alert, causing presentation, by the device, of the message a) from the alert b) that includes information about the property, and c) that includes data for the information relating to the previous events.

17. One or more non-transitory computer storage media encoded with instructions that, when executed by one or more computers, cause the one or more computers to perform operations comprising:

determining a location of a device that is associated with a property;

determining, using the location of the device and sensor data from one or more sensors located at the property, that i) the sensor data satisfies one or more sensor data criteria of a monitoring system rule that defines an alert from a plurality of alerts and ii) the location of the device satisfies a location criteria of the monitoring system rule, the location of the device comprising different data than the sensor data;

in response to determining that i) the sensor data satisfies the one or more sensor data criteria of the monitoring system rule that defines the alert from the plurality of alerts and ii) the location of the device satisfies the location criteria of the monitoring system rule, causing presentation, by the device, of a message a) from the alert and b) that includes information about the property;

tracking a status of the alert; and after causing presentation, by the device, of the message from the alert:

preventing presentation of other alerts on the device until the tracking has been canceled;

determining whether the device received user input responsive to the message; and determining, using a result of the determination whether the device received user input responsive to the message, whether to i) maintain the prevention of presentation of other alerts and continue tracking the status of the alert or ii) canceling tracking the status of the alert and allow presentation of other alerts on the device.

18. The one or more non-transitory computer storage media of claim 17, wherein:

determining the location of the device comprises receiving, by one or more computers and from the device, first data representing the location of the device determined using one or more sensors included in the device;

determining the alert comprises retrieving, by the one or more computers and from a database, second data representing the alert that includes data for the message; and causing presentation of the message comprises providing, by the one or more computers and to the device and using the second data, instructions to cause the device to present the message.

* * * * *